(12) United States Patent
Yokoyama et al.

(10) Patent No.: US 7,477,321 B2
(45) Date of Patent: Jan. 13, 2009

(54) VIDEO DISPLAY SYSTEM AND VIDEO DISPLAY CONTROL APPARATUS

(75) Inventors: Tatsuya Yokoyama, Tokyo (JP); Yuka Ohashi, Tokyo (JP); Jin Sato, Tokyo (JP); Ayumi Mizobuchi, Tokyo (JP); Yushi Sayama, Tokyo (JP); Mami Uchida, Saitama (JP); Tatsushi Nashida, Kanagawa (JP); Goro Takaki, Kanagawa (JP); Kirihito Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 976 days.

(21) Appl. No.: 10/514,008

(22) PCT Filed: May 12, 2003

(86) PCT No.: PCT/JP03/05908

§ 371 (c)(1),
(2), (4) Date: Nov. 9, 2004

(87) PCT Pub. No.: WO03/096678

PCT Pub. Date: Nov. 20, 2003

(65) Prior Publication Data

US 2005/0174489 A1 Aug. 11, 2005

(30) Foreign Application Priority Data

May 13, 2002 (JP) ............................. 2002-137774

(51) Int. Cl.
*H04N 7/00* (2006.01)
*H04N 5/44* (2006.01)
*H04N 9/74* (2006.01)
*H04N 5/66* (2006.01)

(52) U.S. Cl. ...................... 348/553; 348/552; 348/739; 348/578; 348/734

(58) Field of Classification Search ................. 348/552, 348/553, 565, 588, 569, 705, 706, 725, 739, 348/838, 839, 632, 578, 734; 345/173, 1.1, 345/2.1–2.3; 715/702, 719, 771; 725/81, 725/151, 153; 455/3.06

See application file for complete search history.

(56) References Cited

U.S. PATENT DOCUMENTS 6,456,334 B1 * 9/2002 Duhault ...................... 348/565

(Continued)

FOREIGN PATENT DOCUMENTS

EP 1 079 626 2/2001

(Continued)

*Primary Examiner*—Victor R Kostak
(74) *Attorney, Agent, or Firm*—Frommer Lawrence & Haug LLP; William S. Frommer

(57) ABSTRACT

There is provided a video display system in which when supplying a video signal from a base station (200) to a plurality of display units (transportable one 100 and large-screen one 300), an operation instruction generator generates a screen select instruction corresponding to the direction of the user's touch on a touch panel (121) provided on the display screen of the transportable display unit (100) that displays an image corresponding to a video signal supplied from the base station (200) and transmits the operation instruction from the transportable display unit (100) to the base station (200), and a controller included in the base station (200) controls the channel selecting operation of two turning means included in the base station (200) correspondingly to the supplied operation instruction. Stroking the surface of the touch panel (121) on the display screen of the transportable display unit (100), the user can transfer an image between the plurality of display units (100, 300). Thus, the user can intuitively select an operation of the video display system in a manner different from that using a button on the conventional remote controller.

62 Claims, 11 Drawing Sheets

U.S. PATENT DOCUMENTS

| | | | |
|---|---|---|---|
| 6,496,122 B2 * | 12/2002 | Sampsell | 340/825.69 |
| 6,701,526 B1 * | 3/2004 | Trovato | 725/39 |
| 7,036,083 B1 * | 4/2006 | Zenith | 715/758 |
| 7,290,698 B2 * | 11/2007 | Poslinski et al. | 235/375 |
| 2001/0035860 A1 | 11/2001 | Segal et al. | |
| 2004/0152414 A1 * | 8/2004 | Wang | 455/3.04 |
| 2004/0176061 A1 * | 9/2004 | Zehnle et al. | 455/191.1 |
| 2005/0028222 A1 * | 2/2005 | Megeid | 725/135 |
| 2005/0128362 A1 * | 6/2005 | Teichner et al. | 348/725 |
| 2006/0053444 A1 * | 3/2006 | Rudolph et al. | 725/38 |
| 2006/0064734 A1 * | 3/2006 | Ma | 725/136 |

FOREIGN PATENT DOCUMENTS

| | | |
|---|---|---|
| EP | 1 189 391 | 3/2002 |
| JP | 9-298677 | 11/1997 |
| JP | 2000-83178 | 3/2000 |
| JP | 2001-103335 | 4/2001 |

* cited by examiner

THROW OPERATION

BEFORE OPERATION

AFTER OPERATION

CONTENT B

ANIMATION

CONTENT B

CONTENT B

CATCH OPERATION

BEFORE OPERATION

AFTER OPERATION

ANIMATION

SWAP OPERATION

BEFORE OPERATION

AFTER OPERATION

ANIMATION

VIDEO DISPLAY SYSTEM AND VIDEO DISPLAY CONTROL APPARATUS

TECHNICAL FIELD

The present invention relates to a video display system including at least two display units and a base station that supplies a video signal to the display units, and a video display controller for use in the video display system.

This application claims the priority of the Japanese Patent Application No. 2002-137774 filed on May 13, 2002, the entirety of which is incorporated by reference herein.

BACKGROUND ART

In a TV set with an accessory remote commander (will be referred to as "remote controller" hereunder), if any, the user of the TV set can make an image quality control, timer setting or the like, for example, by using the remote controller to display a performable-operations menu on a display screen of the TV set, and select an item for an intended operation, image quality control or timer setting, from the menu being displayed on the display screen, and can make an image quality control or timer setting by operating the remote controller according to a guidance or the like being displayed on the display screen.

Also, in a receiver that receives a satellite broadcast signal, such as STB (set-top box), IRD (integrated receiver decoder) or the like, data such as a so-called electronic program guide (EPG) is displayed on the display screen of a monitor receiver. In this case, selection, by a remote controller accessory to the receiver, of a desired program according to an EPG being displayed on the display screen of the monitor receiver leads to selection of a desired one of channels available on the receiver.

As above, in a TV set or a receiver that receives a television broadcast signal, a combination of the display of instructive information such as a menu, guidance or EPG on the display screen with a user's operation of the remote controller enables a user-friendly, relatively easy selection of a desired operation.

In some cases, however, the use of the remote controller will be made complicated by the above-mentioned combination of the display, on the display screen of the TV set or the like, of necessary information such as a menu, guidance or the like for having the TV set, STB or IRD make a user-intended operation in response to a remote-control operation made by the user in watching the instructive information being displayed on the screen.

For instance, the user has to scroll through a plurality of menu pages, if any, in order to select a menu page including a desired item of operation, the user has to operate the remote controller many times to move the cursor on the display screen, and also the user has to operate the remote controller to "set" each selected item of operation.

Employment of an LCD (liquid crystal display) panel or the like has given birth to more compact and lightweight monitors such as TV sets. Thus, the user can transport such a modern TV set easily and use it near him or her. In case the user uses such a TV set near him, he will not need any more remote controller for operating his TV set. Rather, the user will be bored with the operation of a remote controller as an external input unit for a receiver or the like, that supplies video and audio signals to the TV set.

On this account, the Applicant of the present invention proposed, in the Japanese Published Unexamined Patent Application No. 2002-34023, a two-way communication system capable of building an easier-to-use home network that permits the user to watch video information such as a TV program on a display unit, listen to audio information from the display unit, and make remote control of a base station and an external input unit connected to the base station according to instructive information displayed on a display element of the display unit and by the use of a screen-touch positioning means such as a touch panel, whereby the user is set free from such troublesome operations those with the conventional remote controller.

With the two-way communication system disclosed in the above Applicant's Japanese Published Unexamined Patent Publication No. 2002-34023, the user can make remote control of the base station and external input unit connected to the base station according to the instructive information displayed on the display element of the display unit and by the use of the screen-touch positioning means such as a touch panel, and can thus easily select a desired image for display on the display unit.

DISCLOSURE OF THE INVENTION

Accordingly, the present invention has an object to overcome the above-mentioned drawbacks of the related art by providing a video display system permitting the user, who is going to supply a video signal from a base station to a plurality of display units by the aforementioned two-way communication system already proposed by the Applicant of the present invention, to transfer a video signal between the base station and plurality of display units by stroking the surface of a display screen of the display unit with the finger, and thus the user to intuitively select an operation in a manner quite different from that in which he or she will make such a selection using buttons provided on the conventional remote controller, and a video display controller for the video display system.

The above object can be attained by providing a video display system including a minimum of two display units and a base station that supplies a video signal to the display units, in which according to the present invention, the base station includes:

a minimum of two tuning means capable of selecting a reception channel independently of each other; a video signal output means for supplying a video signal on a reception channel selected by each of the minimum of two tuning means to the minimum of two display units; a two-way communication means for transferring information signals to and from at least one of the minimum of two display units; and a control means for controlling the minimum of two tuning means, and at least one of the minimum of two display units which transfers information signals to and from the base station includes: a two-way communication means for transferring the information signals to and from the base station; a video display for displaying an image corresponding to the video signal supplied from the base station; a screen-touch positioning means provided on a display screen of the video display and which the user is to touch and stroke to recognize the location of a user's touch on the surface of the display screen; and an operation instruction generating means for generating a display-image select instruction corresponding to the direction of a user's touch by identifying the direction of the user's touch on the display screen solely on the basis of a detection output of screen-touch location from the screen-touch positioning means, receiving the display-image select instruction generated by the operation instruction generating means via the two-way communication means, the controlling means in the base station controlling the channel selecting operation of the minimum of two tuning means according to the display-image select instruction.

In the above video display system according to the present invention, the screen-touch positioning means includes a touch panel and a coordinate detector that recognizes the location of the user's touch on the display screen as a coordinate position, for example, extracts sample points at every fixed times or distances from a detection output given by the coordinate detector correspondingly to a user's stroking of the touch panel, judges, based on an aspect ratio of the user's stroking, in which direction the stroking has been made, horizontal or vertical, and has the operation instruction generating means generate a display-image select instruction corresponding to the result of the judgment.

Also, in the above video display system according to the present invention, the operation instruction generating means generates a display-image select instruction corresponding to the direction of a user's stroking taken as a valid one when the stroke is larger in length than specified and shorter in duration than specified, for example.

Also in the above video display system according to the present invention, the display unit including the two-way communication means that transfers information signals to and from the base station has the operation instruction generating means generate an operation instruction formed with a channel select command assigned to a horizontal stroke, for example, to thereby control the channel selecting operation of the tuning means that supplies a video signal from the base station to the display unit.

Also in the above video display system according to the present invention, the display unit including the two-way communication means that transfers information signals to and from the base station has the operation instruction generating means generate, in case the user strokes the display screen with the finger upward, downward or downward and upward, for example, an operation instruction formed with any of first to third screen swap commands assigned to the finger stroke, as a display-image select instruction corresponding to the stroking direction, to thereby control the channel selection for setting, according to an operation instruction formed with the first screen swap command assigned to the finger stroke, the reception channel of the tuning means that supplies a video signal from the base station to the display unit to that of the tuning means that supplies from the base station to the other display unit; control the channel selection for setting, according to an operation instruction formed with the second screen swap command assigned to the finger stroke, the reception channel of the tuning means that supplies a video signal from the base station to the other display unit to that of the tuning means that supplies from the base station to the display unit; and control the channel selection for swapping, according to the operation instruction formed with the third screen swap command assigned to the finger stroke, the reception channel of the tuning means that supplies a video signal from the base station to the display unit with that of the tuning means that supplies from the base station to the other display unit.

Also in the above video display system according to the present invention, the display unit including the two-way communication means that transfers information signals to and from the base station provides an animation display indicating that a screen swapping has been made correspondingly to the first to third screen swap commands, for example.

Also in the above video display system according to the present invention, the display unit including the two-way communication means that transfers information signals to and from the base station has the operation instruction generating means generate an operation instruction formed with a channel select command assigned to a horizontal stroke on the basis of a detection output of screen-touch location from the screen-touch positioning means, for example, and transmits the operation instruction to the base station via the two-way communication means, to thereby control the channel selecting operation of the tuning means that supplies a video signal from the base station to the display unit.

Also in the above video display system according to the present invention, the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, for example, and transmits the operation instruction to the base station via the two-way communication means, to thereby control the channel selection for setting the reception channel of the tuning means that supplies the video signal to the display unit to that of the tuning means that supplies the video signal from the base station to the other display unit.

Also in the above video display system according to the present invention, the display unit including the two-way communication means that transfers information signals to and from the base station judges whether a screen swapping corresponding to the vertical stroke is possible and generates an operation instruction formed with the screen swap command assigned to the finger stroke when the screen swap operation is possible, for example, to thereby call an operation for selection of the reception channel of the other display unit and provide an animation display indicating that a screen swapping corresponding to the vertical stroke has been made.

Also in the above video display system according to the present invention, receiving a call for an operation for selection of a reception channel selection under the screen swap command, for example, the other display unit controls screen fade-out and sound muting and makes a signal selection to fade in the screen and cancel the sound muting.

Also in the above video display system according to the present invention, the display unit including the two-way communication means that transfers information signals to and from the base station has the operation instruction generating means generate an operation instruction formed with a screen-swap command assigned to a vertical stroke on the basis of a detection output of screen-touch location from the screen-touch positioning means, for example, and transmits the operation instruction to the base station via the two-way communication means, to thereby control the channel selection for setting the reception channel of the tuning means that supplies the video signal from the base station to the other display unit to that of the tuning means that supplies the video signal from the base station to the display unit.

Also in the above video display system according to the present invention, the display unit including the two-way communication means that transfers information signals to and from the base station judges whether the screen swapping corresponding to the vertical stroke is possible, for example, catches the reception channel of the other display unit when the screen swapping is determined to be possible, generates an operation instruction formed with the screen swap command assigned to the finger stroke, calls an operation for selection of the reception channel of the other display unit, and provides an animation display indicating that the screen swapping corresponding to the vertical stroke has been done, to thereby make a channel selection for switching the reception channel of the display unit to the caught reception channel of the other display unit.

Also in the above video display system according to the present invention, receiving a call for an operation for selection of a reception channel under the screen swap command, for example, the other display unit makes a catch indication to inform that its reception channel has been caught by the display unit with no channel selection.

Also in the above video display system according to the present invention, the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, for example, and transmits the operation instruction to the base station via the two-way communication means, to thereby control the channel selection for swapping the reception channel of the tuning means that supplies a video signal from the base station to the display unit with that of the tuning means that supplies a video signal from the base station to the other display unit.

Also in the above video display system according to the present invention, the display unit including the two-way communication means that transfers information signals to and from the base station judges whether a screen swapping corresponding to the vertical stroke is possible, for example, catches the reception channel of the other display unit when the screen swapping is determined to be possible, generates an operation instruction formed with a screen swap command assigned to the finger stroke, calls an operation for switching the reception channel of the other display unit to that of the display unit, and provides an animation display indicating that the screen swapping corresponding to the vertical stroke has been done, to thereby make a channel selection for switching the reception channel of the display unit to the caught reception channel of the other display unit.

Also in the above video display system according to the present invention, receiving a call for an operation for selection of a reception channel under the screen swap command, for example, the other display unit controls screen fade-out and sound muting and makes a signal selection to fade in the screen and cancel the sound muting.

Also, the above object can be attained by providing a video display system including a minimum of two display units and a base station that supplies a video signal to the display units, in which according to the present invention: the base station includes: a signal selecting means for selecting one of a plurality of input video signals for supply to the minimum of two display units; a video signal output means for supplying the video signal selected by the signal selecting means to the minimum of two display units; a two-way communication means for transferring information signals to and from at least one of the minimum of two display units; and a control means for controlling the signal selecting means, and at least one of the minimum of two display units which transfers information signals to and from the base station includes: a two-way communication means for transferring the information signals to and from the base station; a video display for displaying an image corresponding to the video signal supplied from the base station; a screen-touch positioning means provided on a display screen of the video display and which the user is to touch and stroke to recognize the location of a user's touch on the surface of the display screen; and an operation instruction generating means for generating a display-image select instruction corresponding to the direction of a user's touch by identifying the direction of the user's touch on the display screen solely on the basis of a detection output of screen-touch location from the screen-touch positioning means, receiving the display-image select instruction generated by the operation instruction generating means via the two-way communication means, the controlling means in the base station controlling the signal selecting operation of the signal selecting means according to the display-image select instruction.

In the above video display system according to the present invention, the screen-touch positioning means includes a touch panel and a coordinate detector that recognizes the location of the user's touch on the display screen as a coordinate position, for example, extracts sample points at every fixed times or distances from a detection output given by the coordinate detector correspondingly to a user's stroking of the touch panel, judges, based on an aspect ratio of the stroke, in which direction the stroke has been made, horizontal or vertical, and has the operation instruction generating means generate a display-image select instruction corresponding to the result of the judgment.

Also, in the above video display system according to the present invention, the operation instruction generating means generates a display-image select instruction corresponding to the direction of a user's finger stroke taken as a valid one when the stroke is larger in length than specified and shorter in duration than specified, for example.

Also in the above video display system according to the present invention, the display unit including the two-way communication means that transfers information signals to and from the base station has the operation instruction generating means generate an operation instruction formed with a display-image select command assigned to a horizontal stroke, for example, to thereby control the signal selecting operation of the signal selecting means that supplies a video signal from the base station to the display unit.

Also in the above video display system according to the present invention, the display unit including the two-way communication means that transfers information signals to and from the base station has the operation instruction generating means generate, in case the user strokes the display screen with the finger upward, downward or downward and upward, for example, an operation instruction formed with any of first to third screen swap commands assigned to the finger stroke, as a display-image select instruction corresponding to the stroking direction, to thereby control the signal selecting means to supply the video signal supplied from the base station to the display unit to the other display unit as well according to the operation instruction formed with the first screen swap command assigned to the finger stroke; control the signal selecting means to supply the video signal supplied from the base station to the other display unit to the display unit as well according to the operation instruction formed with the second screen swap command assigned to the finger stroke; and control the signal selecting means to supply the other display unit with the video signal supplied from the base station to the display unit while supplying the display unit with the video signal supplied from the base station to the other display unit, according to the operation instruction formed with the third screen swap command assigned to the finger stroke.

Also in the above video display system according to the present invention, the display unit including the two-way communication means that transfers information signals to and from the base station provides an animation display indicating that a screen swapping corresponding to the first to third screen swap commands has been made, for example.

Also in the above video display system according to the present invention, the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, for example, and transmits the operation instruction to the base station via the two-way communication means, to thereby control the signal selecting means to supply the video signal supplied from the base station to the display unit to the other display unit as well.

Also in the above video display system according to the present invention, the display unit including the two-way communication means that transfers information signals to and from the base station judges whether a screen swapping corresponding to the vertical stroke is possible and generates an operation instruction formed with the screen swap command assigned to the finger stroke when the screen swap operation is possible, for example, to thereby call an operation for selecting a video signal at the other display unit and provide an animation display indicating that a screen swapping corresponding to the vertical stroke has been made.

Also in the above video display system according to the present invention, receiving a call for an operation for selection of a video signal under the screen swap command, for example, the other display unit controls screen fade-out and sound muting and makes a signal selection to fade in the screen and cancel the sound muting.

Also in the above video display system according to the present invention, the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, for example, and transmits the operation instruction to the base station via the two-way communication means, to thereby control the signal selecting means to supply the video signal supplied from the base station to the other display unit to the display unit as well.

Also in the above video display system according to the present invention, the display unit including the two-way communication means that transfers information signals to and from the base station judges whether the screen swapping corresponding to the vertical stroke is possible, catches input information to the other display unit when the screen swapping is determined to be possible, generates an operation instruction formed with the screen swap command assigned to the finger stroke, calls an operation for selection of the video signal at the other display unit, and provides an animation display indicating that a screen swapping corresponding to the vertical stroke has been done, for example, to thereby make a signal selection for switching the video signal at the display unit to that formed from the caught input information to the other display unit.

Also in the above video display system according to the present invention, receiving a call for an operation for selection of a video signal under the screen swap command, for example, the other display unit makes a catch indication to inform that the input information has been caught by the display unit with no video signal selection.

Also in the above video display system according to the present invention, the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, for example, and transmits the operation instruction to the base station via the two-way communication means, to thereby control the signal selecting means to supply the other display unit with the video signal supplied from the base station to the display unit while supplying the display unit with the video signal supplied from the based station to the other display unit.

Also in the above video display system according to the present invention, the display unit including the two-way communication means that transfers information signals to and from the base station judges whether the screen swapping corresponding to the vertical stroke is possible, catches input information to the other display unit when the screen swapping is determined to be possible, generates an operation instruction formed with the screen swap command assigned to the vertical stroke, calls an operation for switching the video signal at the other display unit to that at the display unit, and provides an animation display indicating that a screen swapping corresponding to the vertical stroke has been done, for example, to thereby make a signal selection for switching the video signal at the display unit to that formed from the caught input information to the other display unit.

Also in the above video display system according to the present invention, receiving a call for an operation for selection of a video signal under the screen swap command, for example, the other display unit controls screen fade-out and sound muting and makes a signal selection to fade in the screen and cancel the sound muting.

Also, the above object can be attained by providing a video display controller for use in a video display system including a minimum of two display units and a base station that supplies a video signal to the display units, in which according to the present invention: the base station includes: a minimum of two tuning means each capable of selecting a reception channel independently of each other; a video signal output means for supplying a video signal on the reception channel selected by each of the minimum of two tuning means to the minimum of two display units; a two-way communication means for transferring information signals to and from at least one of the minimum of two display units; and a control means for controlling the minimum of two tuning means, and at least one of the minimum of two display units which transfers information signals to and from the base station includes: a two-way communication means for transferring the information signals to and from the base station; a video display for displaying an image corresponding to the video signal supplied from the base station; a screen-touch positioning means provided on a display screen of the video display and which the user is to touch and stroke to recognize the location of a user's touch on the surface of the display screen; and an operation instruction generating means for generating a display-image select instruction corresponding to the direction of a user's touch by identifying the direction of the user's touch on the display screen solely on the basis of a detection output of screen-touch location from the screen-touch positioning means, receiving the display-image select instruction generated by the operation instruction generating means in the display unit via the two-way communication means, the controlling means in the base station controlling the channel selecting operation of the minimum of two tuning means according to the display-image select instruction.

In the above video display controller according to the present invention, the screen-touch positioning means includes a touch panel and a coordinate detector that recognizes the location of the user's touch on the display screen as a coordinate position, for example, extracts sample points at every fixed times or distances from a detection output given by the coordinate detector correspondingly to a user's stroking of the touch panel, judges, based on an aspect ratio of the stroke, in which direction the stroke has been made, horizontal or vertical, and has the operation instruction generating means generate a display-image select instruction corresponding to the result of the judgment.

Also, in the above video display controller according to the present invention, the operation instruction generating means generates a display-image select instruction corresponding to the direction of a user's finger stroke taken as a valid one when the stroke is larger in length than specified and shorter in duration than specified, for example.

Also in the above video display controller according to the present invention, the display unit including the two-way communication means that transfers information signals to and from the base has the operation instruction generating means generate an operation instruction formed with a channel select command assigned to a horizontal stroke, for example, to thereby control the channel selecting operation of the tuning means that supplies a video signal from the base station to the display unit Also in the above video display controller according to the present invention, the display unit including the two-way communication means that transfers information signals to and from the base station has the operation instruction generating means generate, in case the user strokes the display screen with the finger upward, downward or downward and upward, for example, an operation instruction formed with any of first to third screen swap commands assigned to the finger stroke, as a display-image select instruction corresponding to the stroking direction, to thereby control the channel selection for setting, according to the operation instruction formed with the first screen swap command assigned to the finger stroke, the reception channel of the tuning means that supplies a video signal from the base station to the display unit to that of the tuning means that supplies from the base station to the other display unit; control the channel selection for setting, according to the operation instruction formed with the second screen swap command assigned to the finger stroke, the reception channel of the tuning means that supplies a video signal from the base station to the other display unit to that of the tuning means that supplies from the base station to the display unit; and control the channel selection for swapping, according to the operation instruction formed with the third screen swap command assigned to the finger stroke, the reception channel of the tuning means that supplies a video signal from the base station to the display unit with that of the tuning means that supplies from the base station to the other display unit.

Also in the above video display controller according to the present invention, the display unit including the two-way communication means that transfers information signals to and from the base station provides an animation display indicating that a screen swapping corresponding to the first to third screen swap commands has been made, for example.

Also in the above video display controller according to the present invention, the display unit including the two-way communication means that transfers information signals to and from the base station has the operation instruction generating means generate an operation instruction formed with a channel select command assigned to a horizontal stroke on the basis of a detection output of screen-touch location from the screen-touch positioning means, for example, and transmits the operation instruction to the base station via the two-way communication means, to thereby control the channel selecting operation of the tuning means that supplies a video signal from the base station to the display unit.

Also in the above video display controller according to the present invention, the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, for example, and transmits the operation instruction to the base station via the two-way communication means, to thereby control the channel selection for setting the reception channel of the tuning means that supplies a video signal from the base station to the display unit to that of the tuning means that supplies the video signal from the base station to the other display unit.

Also in the above video display controller according to the present invention, the display unit including the two-way communication means that transfers information signals to and from the base station judges whether a screen swapping corresponding to the vertical stroke is possible and generates an operation instruction formed with the screen swap command assigned to the finger stroke when the screen swap operation is possible, for example, to thereby call an operation for selection of the reception channel of the other display unit and provide an animation display indicating that a screen swapping corresponding to the vertical stroke has been made.

Also in the above video display controller according to the present invention, receiving a call for an operation for selection of a reception channel selection under the screen swap command, for example, the other display unit controls screen fade-out and sound muting and makes a signal selection to fade in the screen and cancel the sound muting.

Also in the above video display controller according to the present invention, the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, for example, and transmits the operation instruction to the base station via the two-way communication means, to thereby control the channel selection for setting the reception channel of the tuning means that supplies the video signal from the base station to the other display unit to that of the tuning means that supplies the video signal from the base station to the display unit.

Also in the above video display controller according to the present invention, the display unit including the two-way communication means that transfers information signals to and from the base station judges whether the screen swapping corresponding to the vertical stroke is possible, catches the reception channel of the other display unit when the screen swapping is determined to be possible, generates an operation instruction formed with the screen swap command assigned to the finger stroke, calls an operation for selection of the reception channel of the other display unit, and provides an animation display indicating that a screen swapping corresponding to the vertical stroke has been done, for example, to thereby make a channel selection for switching the reception channel of the display unit to the caught reception channel of the other display unit.

Also in the above video display controller according to the present invention, receiving a call for an operation for selection of a reception channel under the screen swap command, for example, the other display unit makes a catch indication to inform that its reception channel has been caught by the display unit with no channel selection.

Also in the above video display controller according to the present invention, the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, for example, and transmits the operation instruction to the base station via the two-way communication means, to thereby control the channel selection for swapping the reception channel of the tuning means that supplies a video signal from the base station to the display unit with that of the tuning means that supplies a video signal from the base station to the other display unit.

Also in the above video display controller according to the present invention, the display unit including the two-way communication means that transfers information signals to and from the base station judges whether a screen swapping corresponding to the vertical stroke is possible, catches the reception channel of the other display unit when the screen swapping is determined to be possible, generate an operation instruction formed with a screen swap command assigned to the finger stroke, calls an operation for switching the reception channel of the other display unit to that of the display unit, and provides an animation display indicating that the screen swapping corresponding to the vertical stroke has been done, for example, to thereby make a channel selection for switching the reception channel of the display unit to the caught reception channel of the other display unit.

Also in the above video display controller according to the present invention, receiving a call for an operation for selection of a reception channel under the screen swap command, for example, the other display unit controls screen fade-out and sound muting and makes a signal selection to fade in the screen and cancel the sound muting.

Also, the above object can be attained by providing a video display controller for use in a video display system including a minimum of two display units and a base station that supplies a video signal to the display units, in which according to the present invention: the base station includes: a signal selecting means for selecting one of a plurality of input video signals for supply to the minimum of two display units; a video signal output means for supplying the video signal selected by the signal selecting means to the minimum of two display units; a two-way communication means for transferring information signals to and from at least one of the minimum of two display units; and a control means for controlling the signal selecting means, and at least one of the minimum of two display units which transfers information signals to and from the base station includes: a two-way communication means for transferring the information signals to and from the base station; a video display for displaying an image corresponding to the video signal supplied from the base station; a screen-touch positioning means provided on a display screen of the video display and which the user is to touch and stroke to recognize the location of a user's touch on the surface of the display screen; and an operation instruction generating means for generating a display-image select instruction corresponding to the direction of a user's touch by identifying the direction of the user's touch on the display screen solely on the basis of a detection output of screen-touch location from the screen-touch positioning means, receiving the display-image select instruction generated by the operation instruction generating means via the two-way communication means, the controlling means in the base station controlling the signal selecting operation of the signal selecting means according to the display-image select instruction.

In the above video display controller according to the present invention, the screen-touch positioning means includes a touch panel and a coordinate detector that recognizes the location of the user's touch on the display screen as a coordinate position, for example, extracts sample points at every fixed times or distances from a detection output given by the coordinate detector correspondingly to a user's stroking of the touch panel, judges, based on an aspect ratio of the stroke, in which direction the stroke has been made, horizontal or vertical, and has the operation instruction generating means generate a display-image select instruction corresponding to the result of the judgment.

Also, in the above video display controller according to the present invention, the operation instruction generating means generates a display-image select instruction corresponding to the direction of a user's finger stroke taken as a valid one when the stroke is larger in length than specified and shorter in duration than specified, for example.

Also in the above video display controller according to the present invention, the display unit including the two-way communication means that transfers information signals to and from the base station has the operation instruction generating means generate an operation instruction formed with a display-image select command assigned to a horizontal stroke, for example, to thereby control the signal selecting operation of the signal selecting means that supplies a video signal from the base station to the display unit.

Also in the above video display controller according to the present invention, the display unit including the two-way communication means that transfers information signals to and from the base station has the operation instruction generating means generate, in case the user strokes the display screen with the finger upward, downward or downward and upward, for example, an operation instruction formed with any of first to third screen swap commands assigned to the finger stroke, as a display-image select instruction corresponding to the stroking direction, to thereby control the signal selecting means to supply the video signal supplied from the base station to the display unit to the other display unit as well according to the operation instruction formed with the first screen swap command assigned to the finger stroke; control the signal selecting means to supply the video signal supplied from the base station to the other display unit to the display unit as well according to the operation instruction formed with the second screen swap command assigned to the finger stroke; and control the signal selecting means to supply the other display unit with the video signal supplied from the base station to the display unit while supplying the display unit with the video signal supplied from the base station to the other display unit, according to the operation instruction formed with the third screen swap command assigned to the finger stroke.

Also in the above video display controller according to the present invention, the display unit including the two-way communication means that transfers information signals to and from the base station provides an animation display indicating that a screen swapping corresponding to the first to third screen swap commands has been made, for example.

Also in the above video display controller according to the present invention, the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, for example, and transmits the operation instruction to the base station via the two-way communication means, to thereby control the signal selecting means to supply the video signal supplied from the base station to the display unit to the other display unit as well.

Also in the above video display controller according to the present invention, the display unit including the two-way communication means that transfers information signals to and from the base station judges whether a screen swapping corresponding to the vertical stroke is possible and generates an operation instruction formed with the screen swap command assigned to the finger stroke on the basis of a detection output of screen-touch location from the screen-touch positioning means when the screen swap operation is possible, for example, and transmits the operation instruction to the base station via the two-way communication means, to thereby call an operation for selecting a video signal at the other display unit and provide an animation display indicating that a screen swapping corresponding to the vertical stroke has been made.

Also in the above video display controller according to the present invention, receiving a call for an operation for selecting a video signal according to the screen swap command, for example, the other display unit controls screen fadeout and sound muting and makes a signal selection to fade in the screen and cancel the sound muting.

Also in the above video display controller according to the present invention, the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, for example, and transmits the operation instruction to the base station via the two-way communication means, to thereby control the signal selecting means to supply the video signal supplied from the base station to the other display unit to the display unit as well.

Also in the above video display controller according to the present invention, the display unit including the two-way communication means that transfers information signals to and from the base station judges whether the screen swapping corresponding to the vertical stroke is possible, catches input information to the other display unit when the screen swapping is determined to be possible, generates an operation instruction formed with the screen swap command assigned to the finger stroke, calls an operation for selection of the video signal at the other display unit, and provides an animation display indicating that a screen swapping corresponding to the vertical stroke has been done, for example, to thereby make a signal selection for switching the video signal at the display unit to that formed from the caught input information to the other display unit.

Also in the above video display controller according to the present invention, receiving a call for an operation for selection of a video signal under the screen swap command, for example, the other display unit makes a catch indication to inform that the input information has been caught by the display unit with no video signal selection.

Also in the above video display controller according to the present invention, the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, for example, and transmits the operation instruction to the base station via the two-way communication means, to thereby control the signal selecting means to supply the other display unit with the video signal supplied from the base station to the display unit while supplying the display unit with the video signal supplied from the based station to the other display unit.

Also in the above video display controller according to the present invention, the display unit including the two-way communication means that transfers information signals to and from the base station judges whether the screen swapping corresponding to the vertical stroke is possible, catches input information to the other display unit when the screen swapping is determined to be possible, generates an operation instruction formed with the screen swap command assigned to the vertical stroke, calls an operation for switching the video signal at the other display unit to that at the display unit, and provides an animation display indicating that a screen swapping corresponding to the vertical stroke has been done, for example, to thereby make a signal selection for switching the video signal at the display unit to that formed from the caught input information to the other display unit.

Also in the above video display controller according to the present invention, receiving a call for an operation for selecting a reception channel according to the screen swap command, for example, the other display unit controls screen fade-out and sound muting and makes a signal selection to fade in the screen and cancel the sound muting.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The present invention will be described in detail below concerning the embodiments thereof with reference to the accompanying drawings.

Figure 1:
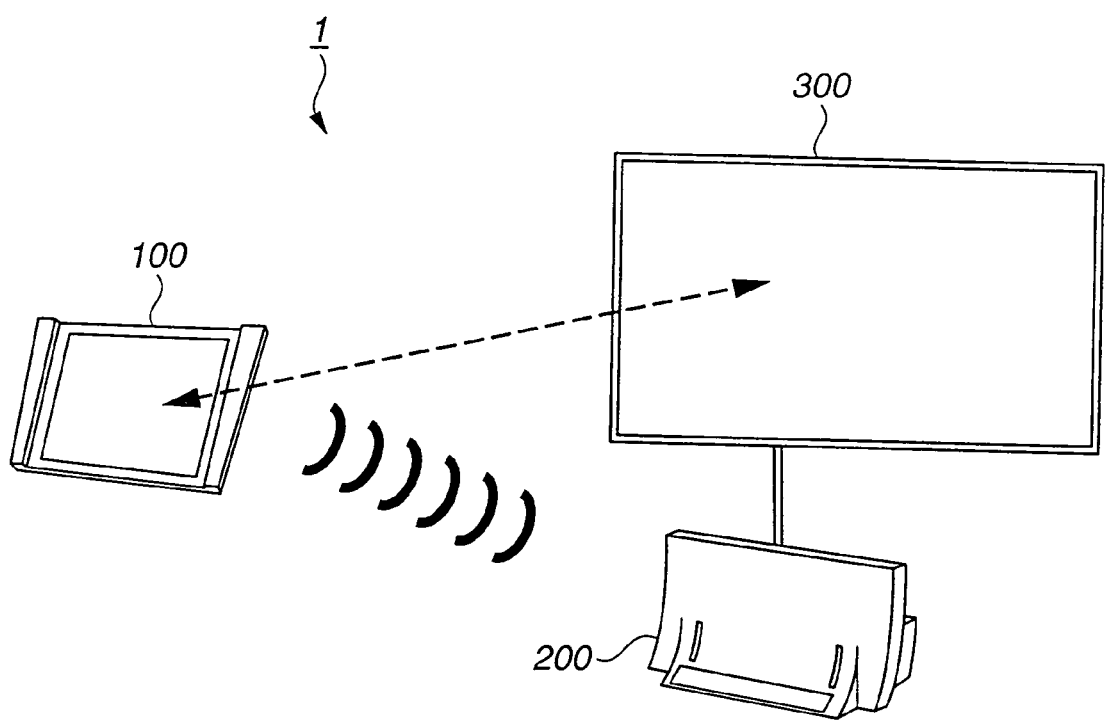
FIG. 1 schematically illustrates a constructional example of a video display system according to the present invention.

The video display system according to the present invention is constructed as shown in FIG. 1 by way of example. As shown, the video display system, generally indicated with a reference 1, includes a transportable display unit 100, a base station 200 and a large-screen display unit 300. A video signal supplied from the base station 200 is displayed on the transportable display unit 100 and large-screen display unit 300.

The transportable display unit 100 is a liquid crystal display (LCD) unit using an LCD panel 107 (as in FIG. 2) as a display element, while the large-screen display unit 300 uses a large-screen plasma display panel.

Figure 2:
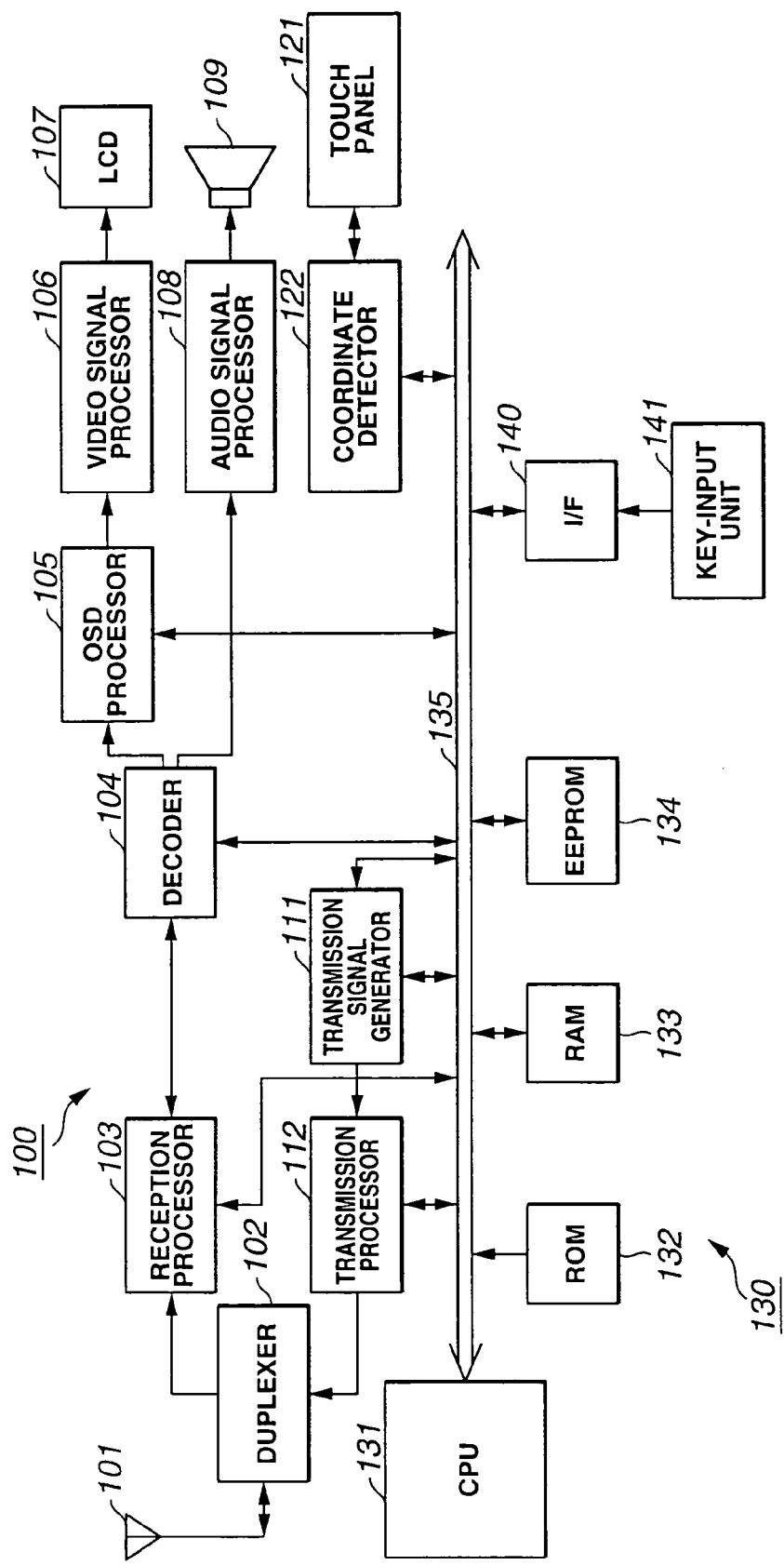
FIG. 2 is a block diagram of a transportable display unit in the video display system in FIG. 1.

As shown in FIG. 2, the transportable display unit 100 includes a transmission/reception antenna 101, antenna duplexer 102, reception processor 103, decoder 104, OSD (on-screen display) processor 105, video processor 106, LCD 107, audio signal amplifier 108, speaker 109, transmission signal generator 111, transmission processor 112, touch panel 121 and a coordinate detector 122.

Each component of the transportable display unit 100 is controlled by a controller 130. The controller 130 is a microcomputer including a CPU (central processing unit) 131, ROM (read-only memory) 132, RAM (random-access memory) 133 and an EEPROM (electrically erasable programmable read-only memory) 134, connected by a CPU bus 135 to one another.

The ROM 132 has recorded therein a variety of processing programs to be executed in the transportable display unit 100 and necessary data for execution of the processing programs. The RAM 133 is used as a work area for various kinds of processing. It provisionally stores and holds data acquired by each processing, for example.

The EEPROM 134 is a so-called nonvolatile memory to hold stored information even if the power supply is turned off. It stores and holds various set parameters, Web sites on the Internet, acquired via the base station 200, electronic mails prepared for transmission via the base station 200, received electronic mails, etc.

The transportable display unit 100 operates when receiving a radio signal from the base station 200 as will be described below.

Between the transportable display unit 100 and base station 200, there are made radio communications using a specified protocol such as the IEEE (Institute Electrical and Engineering Engineers) 802.11 protocol or an extended version of the latter.

The radio signal complying with the specified communication protocol is received by the transmission/reception antenna 101 of the transportable display unit 100 from the base station 200 and supplied to the reception processor 103 via the antenna duplexer (will be referred to simply as "duplexer" hereunder) 102. The duplexer 102 is provided to prevent a transmission signal and reception signal from interfering with each other.

That is, the transportable display unit 100 can receive a signal from the base station 200 via the transmission/reception antenna 101, and transmit an operation instruction from itself or the like by radio from the transmission/reception antenna 101. Thus, the duplexer 102 prevents a transmission signal from the transmission processor 112 from interfering with a signal received via the transmission/reception antenna 101.

The reception processor 103 demodulates or otherwise processes the signal supplied thereto and supplies the demodulated signal to the decoder (expander) 104. The base station 200 compresses, for transmission, video and audio signals of a ground-wave TV program selected by a built-in first or second tuner 202A or 202B, display image and sound data such as text data, video data, etc. received via its own modem, or information signal such as video and audio signals of a satellite broadcast program from a STB.

The decoder 104 included in the transportable display unit 100 is supplied with the decoded compressed signal from the reception processor 103, separates it into video and audio signals, expands the separated signals, respectively, and thus reproduces the initial signal before compressed.

Then, the decoder 104 makes a D-A conversion of the decoded video and audio signals to provide analog video and audio signals. Further the decoder 104 supplies the analog video signal to the OSD processor 105 while supplying the analog audio signal to the audio signal amplifier 108.

The OSD processor 105 is a so-called text/graphic processing circuit that processes, in response to the data supplied from the controller 130, the video signal for display of a control-panel image and menu, various messages, and display information such as character, picture, symbol or the like other than the image of a broadcast program.

For example, for display of a control-panel image in response to an instruction given by the user, information for display of the control-panel image is supplied from the controller 130 to the OSD processor 105. In the OSD processor 105, the control-panel image from the controller 130 is combined with the video signal from the decoder 104 and the data thus synthesized is supplied to the video signal processing circuit 106.

Also, for display of character information indicative of a channel to be selected and a sound-volume bar indicative of a loudness of level of sound in response to an instruction given by the user, information for display of the data is supplied from the controller 130 to the OSD processor 105. Then, the control-panel image from the controller 130 is combined with the video signal from the decoder 104, and the data thus synthesized is supplied to the video signal processor 106.

Also, in case the display information such as control-panel image has not to be combined with the video signal, the video signal processing circuit 107 is supplied with the analog video signal from the decoder 104 as it is since no display information is supplied to the OSD processor 105. The video signal processor 106 generates a display signal from the video signal supplied via the OSD processor 105 and supplies it to the LCD 107.

Thus, an image corresponding to the video signal supplied via the radio transmission from the base station 200 is displayed on the display screen of the LCD 107. In this case, when display information such as control-panel image has been synthesized in the OSD processor 105, display information such as the control-panel image is displayed along with an image based on the video signal from the decoder 104.

On the other hand, the audio signal amplifier 108 amplifies the audio signal supplied thereto to a predetermined level, and supplies the amplified audio signal to the speaker 109. Thus, the speaker 109 outputs a sound corresponding to the audio signal transmitted by radio from the base station 200.

As above, the transportable display unit 100 can receive video and audio signals such as a TV broadcast program transmitted by radio from the base station 200, reproduce the received video and audio signals and provide the user with the signals as an image and sound.

Also, the transportable display unit 100 functions as a remote controller that accepts a command given by the user having touched and stroked the touch panel 121 provided on the surface of the LCD 107 and sends an operation instruction corresponding to the command to the base station 200.

That is, the transportable display unit 100 has the touch panel 121 attached on the surface of the LCD 107 to accept an operation instruction given by the user who touches and strokes the surface of the touch panel 121.

Then, the transportable display unit 100 detects, by the coordinate detector 122, a location (coordinate position) on the surface of the touch panel 121 attached to the LCD 107, where the user touches by the finger or the like, and discriminates the user's command entered by the finger-touch by means of the controller 130 on the basis of the detection output of screen-touch location from the coordinate detector 122 to provide an operation instruction corresponding to the command. The controller 130 supplies the operation instruction corresponding to the command to the transmission signal generator 111. The transmission signal generator 111 generates a transmission signal for transmission to the base station 200 from the operation instruction supplied from the controller 130, and supplies the transmission signal to the transmission processor 112. The transmission processor 112 processes the supplied transmission signal by modulation, amplification, etc. to generate a transmission signal in an actually transmitted form, and transmits the transmission signal to the base station 200 via the duplexer 102 and transmission/reception antenna 101.

Thus, the operation instruction transmitted by radio from the transportable display unit 100 is received by the base station 200.

Also, the transportable display unit 100 has a key-input unit 141 connected thereto by an interface (I/F) 140. The key-input unit 141 is provided with an power on/off switch etc. for example. An operation instruction entered with the use of the key-input unit 141 is supplied to the controller 130 via the I/F 140 to turn on the power supply and make an operation corresponding to an operated control key.

Figure 3:
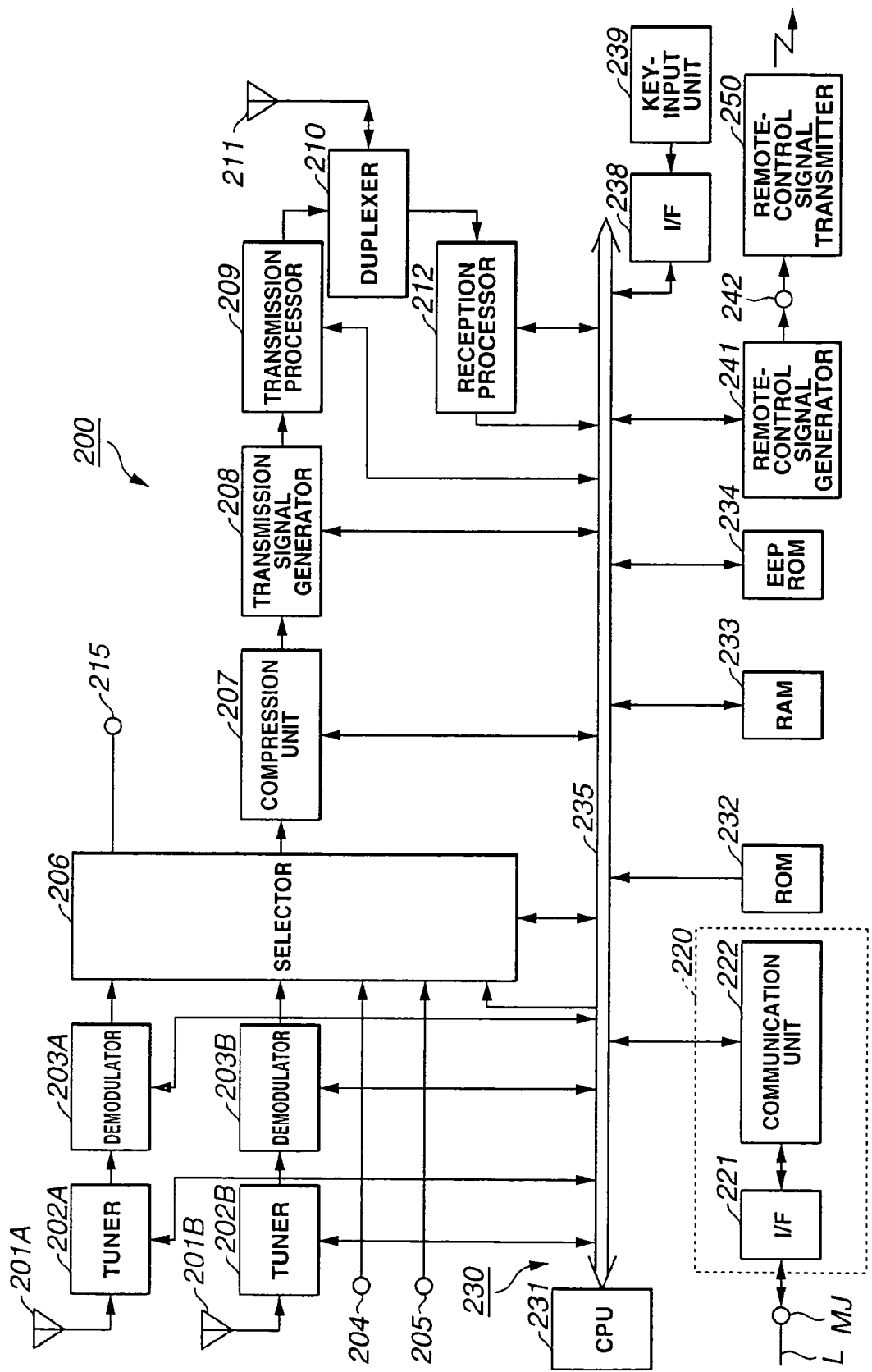
FIG. 3 is also a block diagram of a base station included in the video display system in FIG. 1.

As shown in FIG. 3, the base station 200 included in the video display system 1 includes first and second tuners 202A and 202B each for selecting a TV broadcast signal, and also a so-called modem (modulator/demodulator) intended for connection to a communication network such as a telephone network, Internet or the like. Thus, the base station 200 is connected by a telephone line L to a telephone network. FIG. 3 shows a terminal MJ which is a modular jack for connection with the telephone line L led in from outside the base station 200. Also, the base station 200 has external input terminals 204 and 205 to which any of various external input units such as VTR, STB, IRD, DVD (digital versatile disk) drive, etc. can be connected.

In the base station 200, video and audio signals, acquired by modulation, of a TV broadcast program received from the broadcast station selected by the first tuner 202A, video and audio data acquired from a communication network via its own modem, or information signals such as video and audio signals of a satellite broadcast program from an STB, can be compressed to generate a transmission signal which can be sent to the transportable display unit 100.

Also in the base station 200, video and audio signals, acquired by demodulation, of a TV broadcast program received from a broadcast station selected by the second tuner 202B, video and audio data acquired from a communication network via its own modem, or information signals such as video and audio signals of a satellite broadcast program from an STB, can be supplied from an output terminal 215 to the large-screen display unit 300 via a connection cable.

That is, as shown in FIG. 3, the base station 200 includes the first and second tuners 202A and 202B to be connected to the reception antenna 201A and 201B, respectively, demodulators 203A and 203B, video signal input terminal 204, audio signal input terminal 205, selector 206, compression unit 207, transmission signal generator 208, transmission processor 209, antenna duplexer 210, transmission/reception antenna 211, reception processor 212, etc.

Various components of the base station 200 are controlled by a controller 230 which is a microcomputer including a CPU 231, ROM 232, RAM 233 and EEPROM 234, connected by a CPU bus 235 to one another.

The ROM 232 has recorded therein a variety of processing programs to be executed in the base station 200 and necessary data for execution of the processing programs. The RAM 233 is used as a work area for various kinds of processing. It provisionally stores and holds data acquired by each processing, for example.

The EEPROM 234 is a so-called nonvolatile memory to hold stored information even if the power supply is turned off. It stores and holds information on a broadcast channel having been selected until the main power supply to the base station 200 is turned off. After the power supply is turned on, the EEPROM 234 selects a broadcast signal on a channel having been selected until the last disconnection of the power supply. That is, the EEPROM 234 can provide a so-called last channel memory.

Also, the controller 230 has a modem 220 connected thereto. The modem 220 includes an interface (will be referred to as "I/F" hereunder) 221 and communication unit 222. In this embodiment, the I/F 221 provides an interface between a telephone line and the base station 200. It receives a signal sent via the telephone line and sends a signal from the base station 200 to the telephone line.

The communication unit 222 demodulates a signal received via the I/F 221 and supplies it to the controller 230. On the other hand, it modulates a transmission signal from the controller 230 and supplies it to the I/F 221. Thus, the communication unit 222 can send and receive various kinds of data to and from a destination to which the telephone line is connected.

Also the base station 200 can connect to the Internet via the modem 220, telephone line L and a predetermined ISP (Internet Service Provider) to be served various information via the Internet, send and receive an electronic mail. Thus, the controller 230 can control the modem 220 to be on hook or off hook. When controlling the modem 220 to be off hook, the controller 230 sends a dial signal to the telephone line. Namely, it has a function as a dialer.

Also, the controller 230 of the base station 200 has a remote-control signal transmitter 250 connected thereto via a remote-control signal generator 241 that sends an infra-red remote-control signal, called "remote-control mouse" and a remote-control signal output terminal 242. Thus, the controller 230 generates a remote-control signal corresponding to an operation instruction from the transportable display unit 100 and sends it to an external unit such as an STB from the remote-control signal transmitter 250.

Note that the controller 230 has connected thereto a key-input unit 239 having a power on/off key and various set keys provided thereon by an interface (I/F) 238. Thus, the controller 230 can turn on and off the base station 200 and make various kinds of set inputs by means of the key-input unit 239.

In the video display system 1, the first tuner 202A of the base station 200 selects one of TV broadcast signals received at a reception antenna 101A, which corresponds to a channel selection instruction signal from the controller 230, and supplies it to a demodulator 203A. The demodulator 203A demodulates the supplied TV broadcast signal and supplies the demodulated signal (signals of a TV program) to the selector 206. Similarly, the second tuner 202B selects one of TV broadcast signals received at the reception antenna 101A, which corresponds to a channel selection instruction signal from the controller 230, and supplies it to the demodulator 203B.

In addition to the video signal supplied via the video signal input terminal 204 and audio signal supplied via the input terminal 205, information is supplied from the controller 230 to the selector 206. The information supplied to the selector 206 from the controller 230 includes information on so-called Web sites open on the Internet, information such as electronic mail, downloaded via the modem 220.

The selector 206 selects one of the signal output from the demodulator 203, signal output from the external input terminals 204 or 205 and the signal output from the controller 230 in response to a selection control signal from the controller 230. The selection control signal from the controller 230 to the selector 206 is generated by the controller 230 correspondingly to a command input sent by radio from the transportable display unit 100.

The output from the selector 206 is supplied to the compression unit 207 in which the supplied signal will be compressed by a predetermined compression method. To compress the signal from the selector 206, the compression unit 207 adopts a data compression method such as an MPEG or Wavelet method, for example.

The signal compressed by the compression unit 207 is supplied to the transmission signal generator 208. The transmission signal generator 208 generates a transmission signal in compliance with a predetermined communication protocol. In this embodiment, the base station 200 adopts the IEEE (Institute of Electrical and Electronics Engineers) 802.11 protocol or its extension protocol to generate a transmission signal.

The transmission signal generated by the transmission signal generator 208 is supplied to the transmission processor 209 which will modulate and amplify the supplied transmission signal according to a control signal from the controller 230. The transmission signal thus processed by the transmission processor 209 is sent by radio via the duplexer 210 and transmission/reception antenna 211. Similarly to the duplexer 102 in the transportable display unit 100, the duplexer 210 prevents transmission and reception signals from interfering with each other.

The video and audio signals of a TV broadcast program selected by the first tuner 202A, video and audio signals accepted via the external input terminals 204 and 205, or text data, video and audio data in information acquired via the modem 220, can be supplied to the transportable display unit 100 through the above compression and radio transmission based on a predetermined communication protocol.

Also, the video and audio signals of a TV broadcast program selected by the second tuner 202B, video and audio signals accepted via the external input terminals 204 and 205, or text data, video and audio data in information acquired via the modem 220, can be supplied to the large-screen display unit 300 over an interconnecting cable from the output terminal 215 of the base station 200.

In the video display system 1, since two-way communications are possible between the transportable display unit 100 and base station 200, the user can make remote control of an external unit via the base station 200 by giving a command input to the external unit by touching and stroking the surface of the touch panel 121 of the transportable display unit 100.

Since the transportable display unit 100 is designed compact and lightweight and connected by radio to the base station 200, it is easily transportable. Thus, the user can use the transportable display unit 100 anywhere within a range in which communications with the base station 200 are possible. The transportable display unit 100 can reproduce information signals supplied from the base station 200 and provide the information to the user.

Therefore, use of the transportable display unit 100 enables the user to watch a TV broadcast program selected by the first or second tuner 202A or 202B of the base station 200, to watch a satellite broadcast program carried by a satellite broadcast signal and selected by STB or to watch a movie that is reproduced by a VTR or DVD drive if the latter is connected as an external input unit to the base station 200.

Also, using the transportable display unit 100 enables the user to download and watch information on a so-called Web page provided on the Internet, for example, via the modem of the base station 200, to receive an electronic mail addressed to him or her and display it on the LCD 107 or to prepare an electronic mail and send it to a destination.

Note that for preparation of an electronic mail, the user can operate the transportable display unit 100 in a predetermined manner to display a software keyboard having alphabet keys or 50-character Japanese syllabary keys arranged thereon on the LCD 107. The user can use the software keyboard displayed on the LCD 107 and touch panel 121 to prepare an electronic mail. Then, the user can send the electronic mail thus prepared to the base station 200 by making a predetermined operation such as pressing a send key and then to a destination via the base station 200.

As just described, the base station 200 is a base for providing interconnection between the transportable display unit 100 and one of various information transmission media including an external input unit such as STB, a communication network such as ground-wave TV broadcast or Internet, etc. The transportable display unit 100 can be supplied with information signals from the base station 200, reproduce the signal and deliver the reproduced data to the user, while forming transmission information such as electronic mail and sending it via the base station 200.

Also, in the video display system 1, video and audio signals of the TV broadcast program, video and audio data downloaded from a communication network via the modem of the system 1 itself or information signals such as video and audio signals of a satellite broadcast program from an STB, are supplied from the output terminal 215 of the base station 200 to the large-screen display unit 300, thereby permitting to display a desired image on the large-screen display unit 300.

Figure 4:
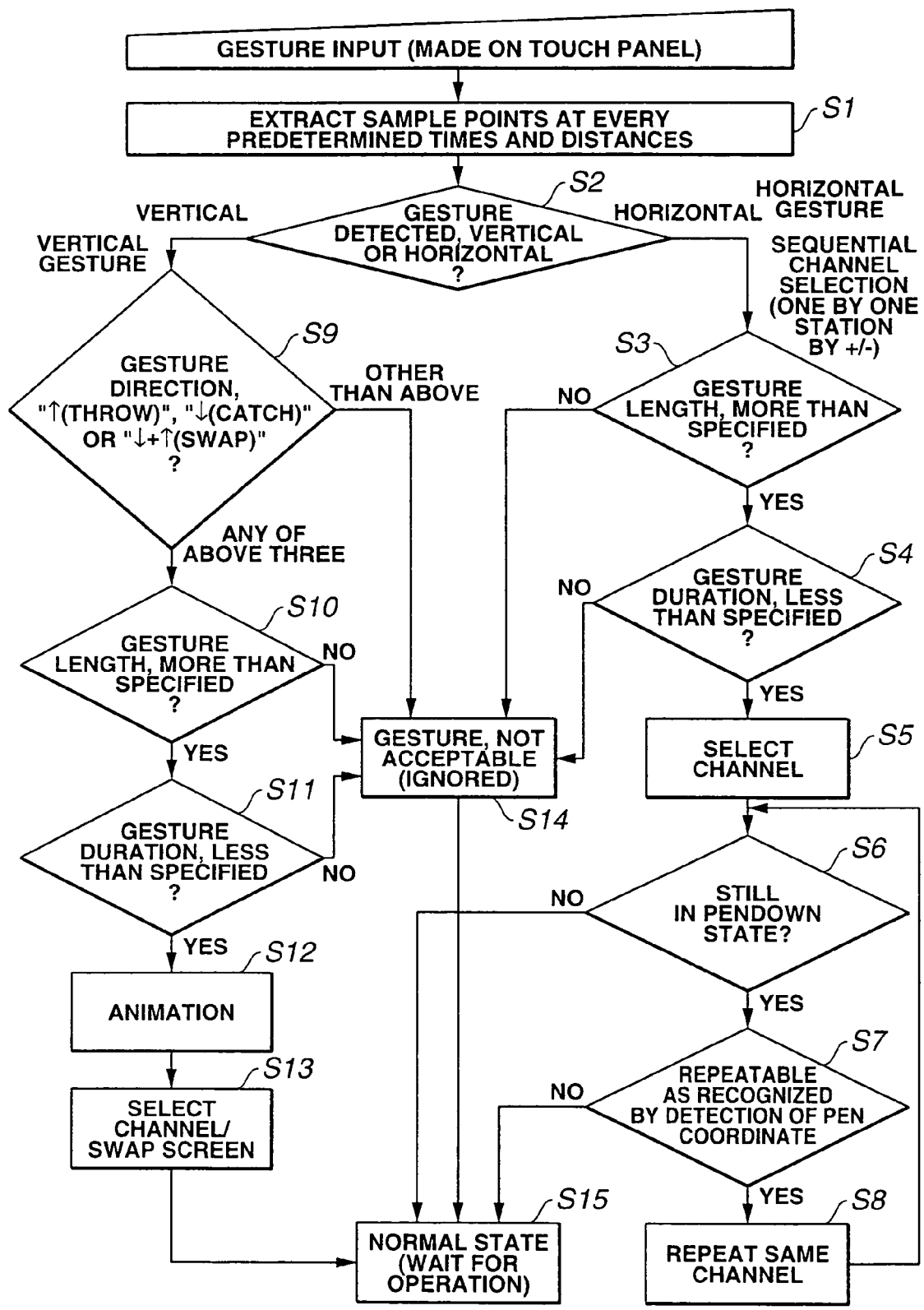
FIG. 4 shows a flow of operations made in controlling the video display system in FIG. 1 by gesture input of a command.

In the video display system 1, a channel select command is assigned to an operation instruction given by touching and horizontally stroking, with the finger, the surface of the touch panel 121 provided on the LCD 107 of the transportable display unit 100, and also a screen swap command is assigned to an operation instruction given by touching and vertically stroking, with the finger, the surface of the touch panel 121, whereby the operation of the video display system 1 can be controlled as will be described below with reference to FIG. 4.

Note that a command input by touching and stroking the surface of the touch panel 121 with the finger will be referred to as "gesture input" hereunder.

As in the flow diagram in FIG. 4, when a command input, namely, a gesture input, is made by stroking the surface of the touch panel 121 with the finger, the controller 130 of the transportable display unit 100 extracts a sample point at every predetermined times and distances on the basis of a detection output of screen-touch location from the coordinate detector 122 (in step S1), and judges which the direction of a gesture indicated by the gesture input is, horizontal or vertical, on the basis of an aspect ratio of the user-made gesture, obtained from the result of extraction (in step S2).

In case the result of the judgment made in step S2 is that the gesture direction is horizontal, the controller 130 judges whether the length of the gesture indicated by the gesture input is more than specified (in step S3). In case the result of the judgment made in step S3 is negative (NO), namely, if the gesture length is not more than specified, the controller 130 ignores the gesture input (in step S14) and will wait for a next gesture input (in step S15).

Also, in case the result of the judgment in step S3 is affirmative (YES), namely, if the gesture length is more than specified, the controller 130 judges whether the duration of the gesture indicated by the gesture input is less than specified (in step S4). In case the result of the judgment in step S4 is negative (NO), namely, if the gesture duration is not less than specified, the controller 130 ignores the gesture input (in step S14) and will wait for a next gesture input (in step S15).

In case the result of the judgment in step S4 is affirmative (YES), namely, if the gesture duration is less than specified, the controller 130 of the transportable display unit 100 takes the gesture input as a channel select gesture input, and generates an operation instruction indicating a channel up command "+" or channel down command "−" correspondingly to the gesture direction indicated by the gesture input and sends it from the transmission processor 112 to the base station 200. Thus, the controller 230 of the base station 200 makes a channel selection corresponding to the operation instruction (in step S5). For example, a channel up command "+" is assigned herein to a gesture input OPA indicated with a rightward arrow in FIG. 5, while a channel down command "−" is assigned to a gesture OPB indicated with a leftward arrow in FIG. 5.

Further, the controller 130 of the transportable display unit 100 judges the gesture input to see whether the user's finger is in touch with the surface of the touch panel 121 (PenDown state) (in step S6). In case the result of the judgment is negative (NO), namely, if there is no PenDown state, the controller 130 waits for a next gesture input (in step S15) taking that the gesture input is over.

Also, if the result of the judgment in step S6 is affirmative (YES), namely, when the PenDown state is held, the controller 130 judge, by detecting a pen coordinate, whether the selection of a channel is repeatable (in step S7). If the result of the judgment is negative (NO), namely, if the channel selection is not repeatable, the controller 130 waits for a next gesture input (in step S15) taking that the gesture input is over.

In case the result of the judgment in step S7 is affirmative (YES), namely if the channel selection is repeatable, the controller 130 generates an operation instruction indicating a select command and sends it from the transmission processor 112 to the base station 200. Thus, the controller 230 of the base station 200 makes a channel selection corresponding to the operation instruction (in step S8). By repeating the above series of operations, a channel is repeatedly selected at every predetermined times.

By taking off the finger (pen) from the touch panel 121 or moving the pen in a direction opposite to the initial gesture direction, the result of the judgment in step S7 will be negative (NO) and the repetition of the same channel selection be canceled.

If the result of the judgment in step S2 is that the gesture direction is vertical, the controller 130 of the transportable display unit 100 judges which the gesture direction is, upward, downward or upward and downward (in step S9). In case the result of the judgment is negative (NO), namely, in case the gesture direction is other than upward, downward or upward and downward, the controller 130 ignores the gesture input (in step S14) and waits for a next gesture input (in step S15).

When the result of the judgment in step S9 is affirmative (YES), namely, if the gesture direction is upward, downward or upward and downward, the controller 130 in the transportable display unit 100 takes that the gesture input is a gesture input for throw, catch or swap, and judges whether the gesture length indicated by the gesture input is more than specified (in step S1). If the result of the judgment is negative (NO), namely, the gesture length is less than specified, the controller 130 ignores the gesture input (in step S14) and waits for a next gesture input (in step S15).

If the result of the judgment in step S10 is affirmative (YES), namely, if the gesture length is more than specified, the controller 130 judges whether the gesture duration indicated by the gesture input is less than specified (in step S11). In case the result of the judgment is negative (NO), namely, if the gesture duration is less than specified, the controller 130 ignores the gesture input (in step S14) and waits for a next gesture input (in step S15).

Note that the specified gesture length as in step S10 and specified gesture duration in step S11 vary depending upon which of throw, catch and swap commands is assigned to a gesture input.

If the result of the judgment in step S10 is affirmative (YES), namely, when the gesture input duration is less than specified, the controller 130 of the transportable display unit 100 takes the gesture input is a gesture input for a throw, catch or swap, and generates an operation instruction indicating a throw, catch or swap command correspondingly to a gesture direction and sends it from the transmission processor 112 to the base station 200.

Figure 5:
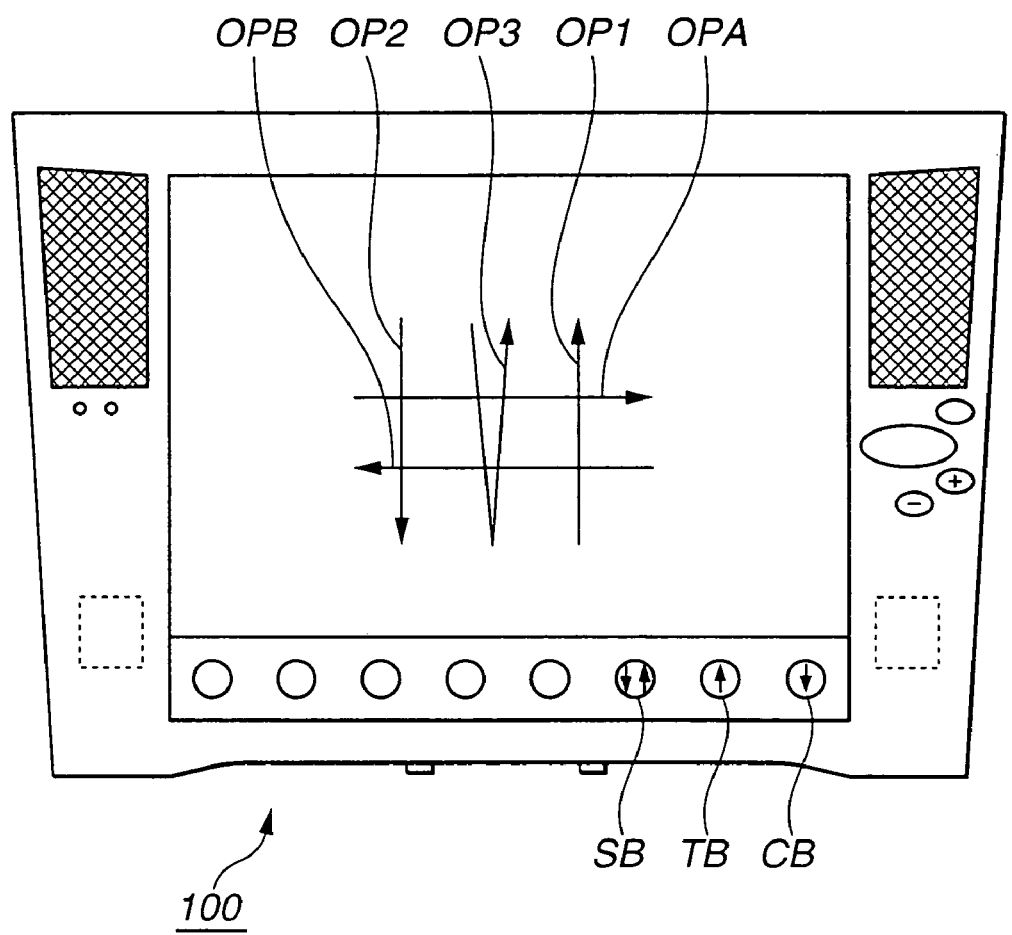
FIG. 5 schematically illustrates gesture input commands supplied via a touch panel provided on the screen of the transportable display unit in the video display system in FIG. 1.

Note here that a throw command is assigned to a gesture input OP1 indicated with an upward arrow in FIG. 5, a catch command is assigned to a gesture input OP2 indicated with a downward arrow in FIG. 5 and a swap command is assigned to a gesture input OP3 indicated with an arrow extending downward and returning upward as in FIG. 5.

Then the controller 230 of the base station 200 makes an animation correspondingly to an operation instruction (in step S12), further selects a channel and swap images (in step S13) and waits for a next gesture input (in step S15).

Figure 6:
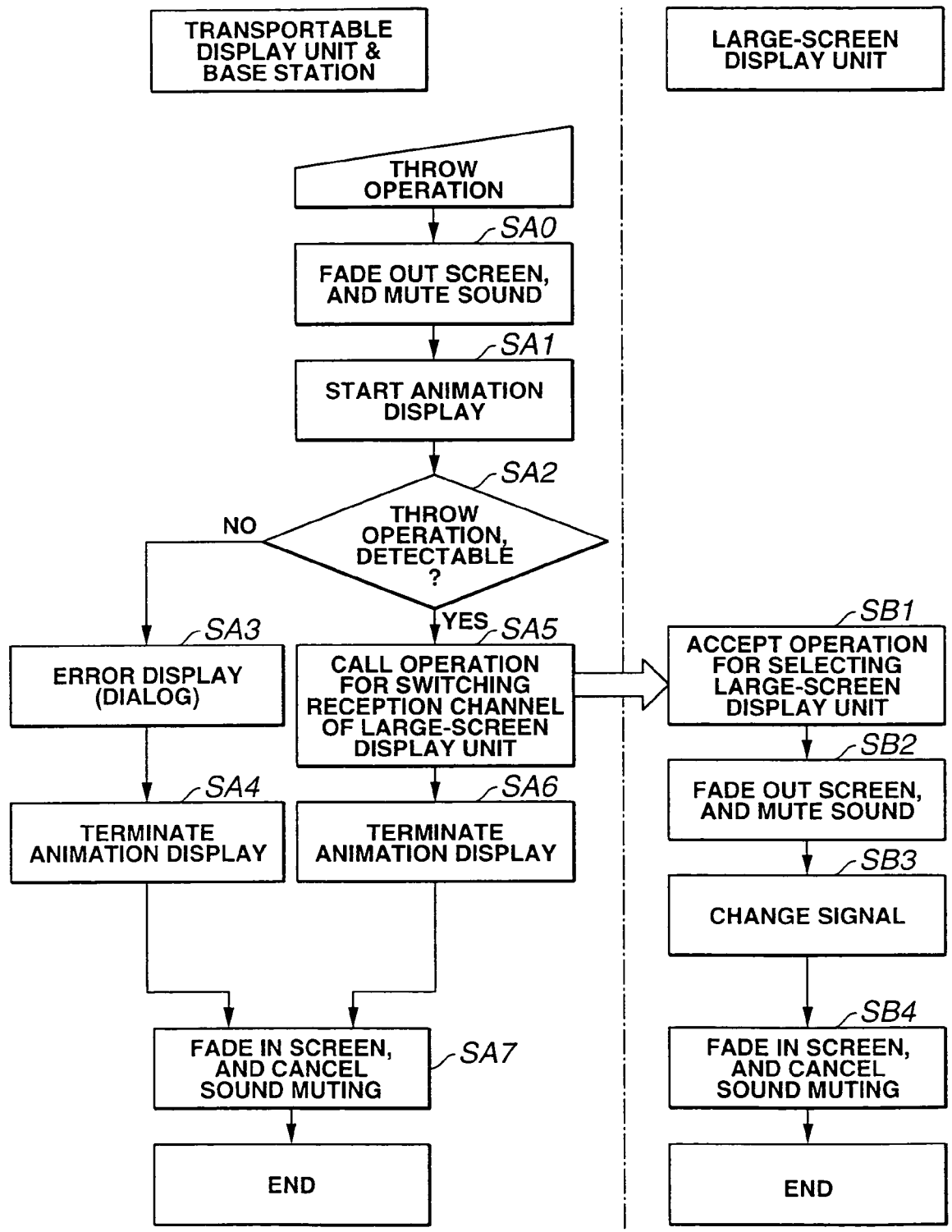
FIG. 6 shows a flow of operations made in controlling the video display system in FIG. 1 by throw-based input of a command.

Here, upon reception of a throw command, the controller 230 of the base station 200 will make a parallel throw-control of both the transportable and large-screen display units 100 and 300 as shown in the flow diagram in FIG. 6.

More specifically, for control of a throw operation, screen fade-out and sound muting are effected at the transportable display unit 100 (in step SA0), an animation display control is started (in step SA1) and it is judged whether the throw operation is possible (in step SA2). In case the result of the judgment is negative (NO), namely, if the throw operation is impossible because the transportable display unit 100 is out of a radio communication range or the transportable display unit 100 is locked against operation at the base station 200, the controller 230 of the latter will make a malfunction indication (in step SA3), terminate the animation display control (in step SA4), fade in the screen and cancel the sound muting (in step SA7), and then exit the throw-operation control.

In case the result of the judgment in step SA2 is affirmative (YES), namely, if the throw operation is possible, the controller 230 will call, from the transportable display unit 100, an operation for switching the reception channel of the large-screen display unit 300 to that of the transportable display unit 100 (in step SA5), terminate the animation display control (in step SA6), fade in the screen and cancel the sound muting (in step SA7), and then exit the throw-operation control.

Upon reception of the call for the operation for switching the reception channel (in step SB1), the large-screen display unit 300 will fade out the screen and control sound muting (in step SB2), make a signal-changing operation such as scan-rate change (in step SB3), fade in the screen and cancel the sound muting (step SB4), and then exit the throw-operation control.

Figure 7A:
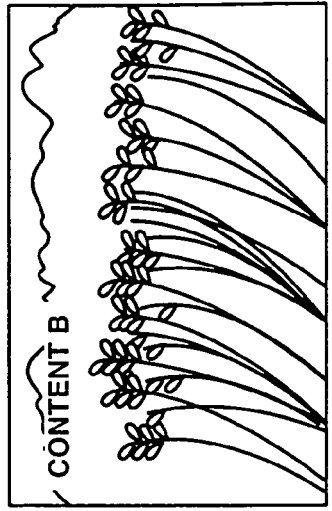
FIG. 7 shows changes of a display by the throw-based command input.
Figure 7A:
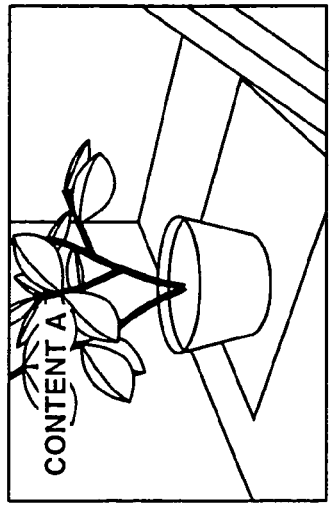
Figure 7B:
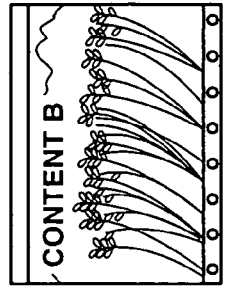
Figure 7B:
Figure 7B:
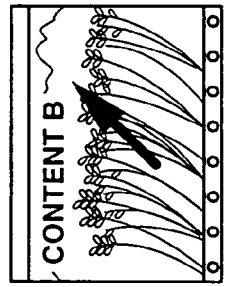
Figure 7B:
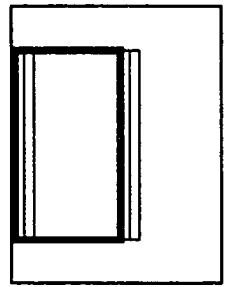

With the above throw-operation control, the display on the large-screen display unit 300 is changed to that on the transportable display unit 100 as shown in FIG. 7A, and the throw operation will be displayed as an animation without change of the display on the transportable display unit 100 as shown in FIG. 7B.

Figure 8:
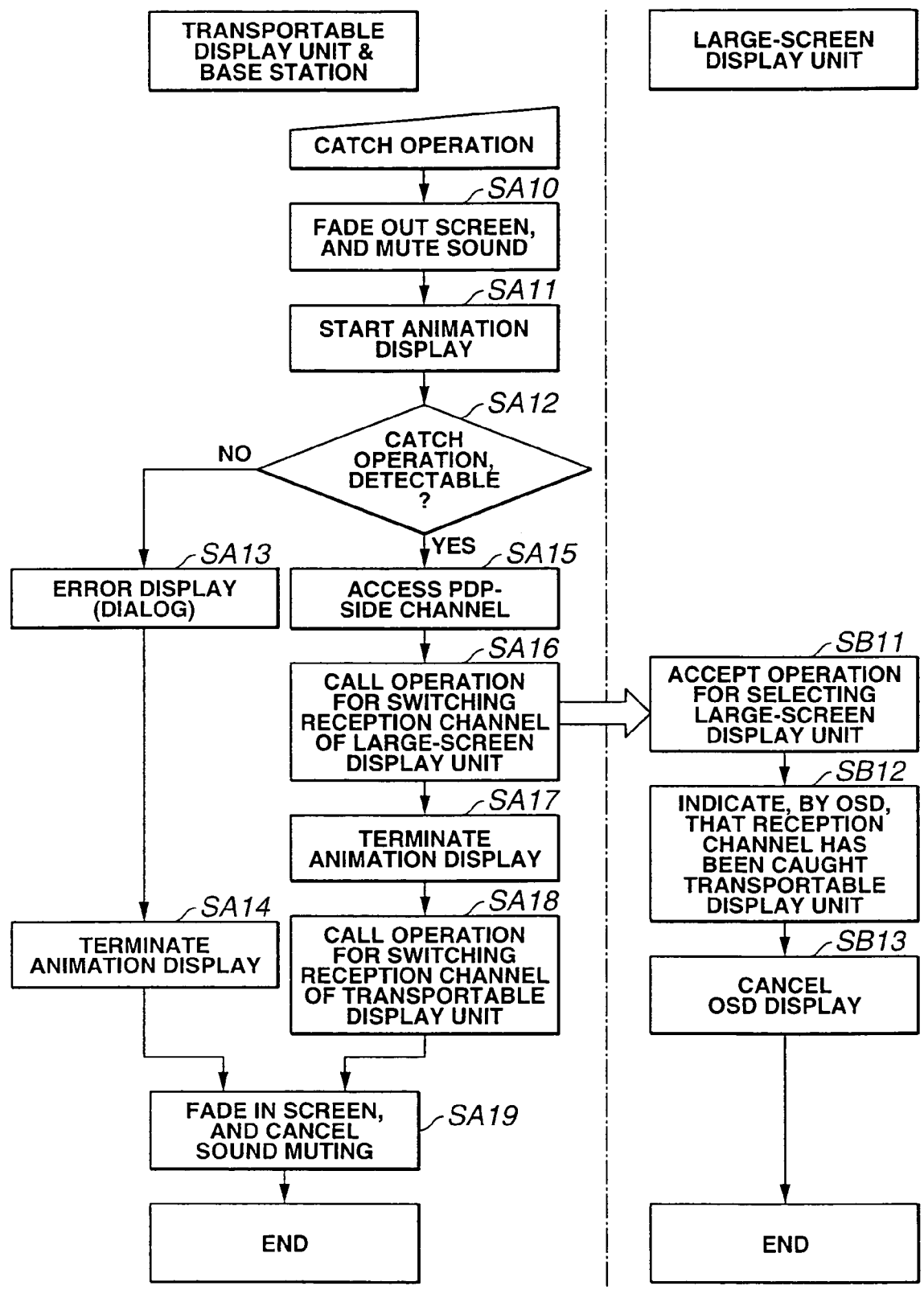
FIG. 8 shows a flow of operations made in controlling the video display system in FIG. 1 by catch-based input of a command.

Also, upon reception of a catch command, the controller 230 of the base station 200 will make a parallel catch-control of both the transportable and large-screen display units 100 and 300 as shown in the flow diagram in FIG. 8.

More specifically, for control of a catch operation, the display screen is faded out and the sounding is muted at the transportable display unit 100 (in step SA10), an animation display control is started (in step SA11) and it is judged whether the catch operation is possible (in step SA12). In case the result of the judgment is negative (NO), namely, if the catch operation is impossible because the transportable display unit 100 is out of a radio communication range or the transportable display unit 100 is locked against operation at the base station 200, the controller 230 of the latter will make a malfunction indication (in step SA13), terminate the animation display control (in step SA14), fade in the screen and cancel the sound muting (in step SA19), and then and exit the catch-operation control.

Also, in case the result of the judgment in step SA12 is affirmative (YES), namely, if the catch operation is possible, the controller 230 will catch the reception channel of the large-screen display unit 300 from the transportable display unit 100 (in step SA15), call, from the transportable display unit 100, an operation for switching the reception channel of the large-screen display unit 300 (in step SA16), terminate the animation display control (in step SA17), execute the operation for switching the reception channel of the transportable display unit 100 to that of the large-screen display unit 300, having been caught in step SA15 (in step SA18), fade in the screen and cancel the sound muting (in step SA19), and then exit the catch-operation control.

Upon reception of the call for the operation for switching the reception channel (in step SB11), the large-screen display unit 300 will display, by OSD, that the reception channel has been caught by the transportable display unit 100 for a predetermined length of time (in step SB12), and cancel the OSD display of the catching of the reception channel (in step SB14), with no channel switching, and then exit the catch-operation control.

Figure 9A:
FIG. 9 shows changes of a display by the catch-based command input.
Figure 9B:
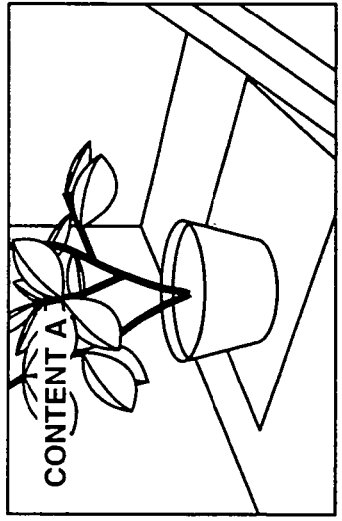

With the above catch-operation control, the large-screen display unit 300 will display an OSD display as shown in FIG. 9A, and the display at the transportable display unit 100 will be changed to a display at the large-screen display unit 300 through display of an animation display as shown in FIG. 9B.

Figure 10:
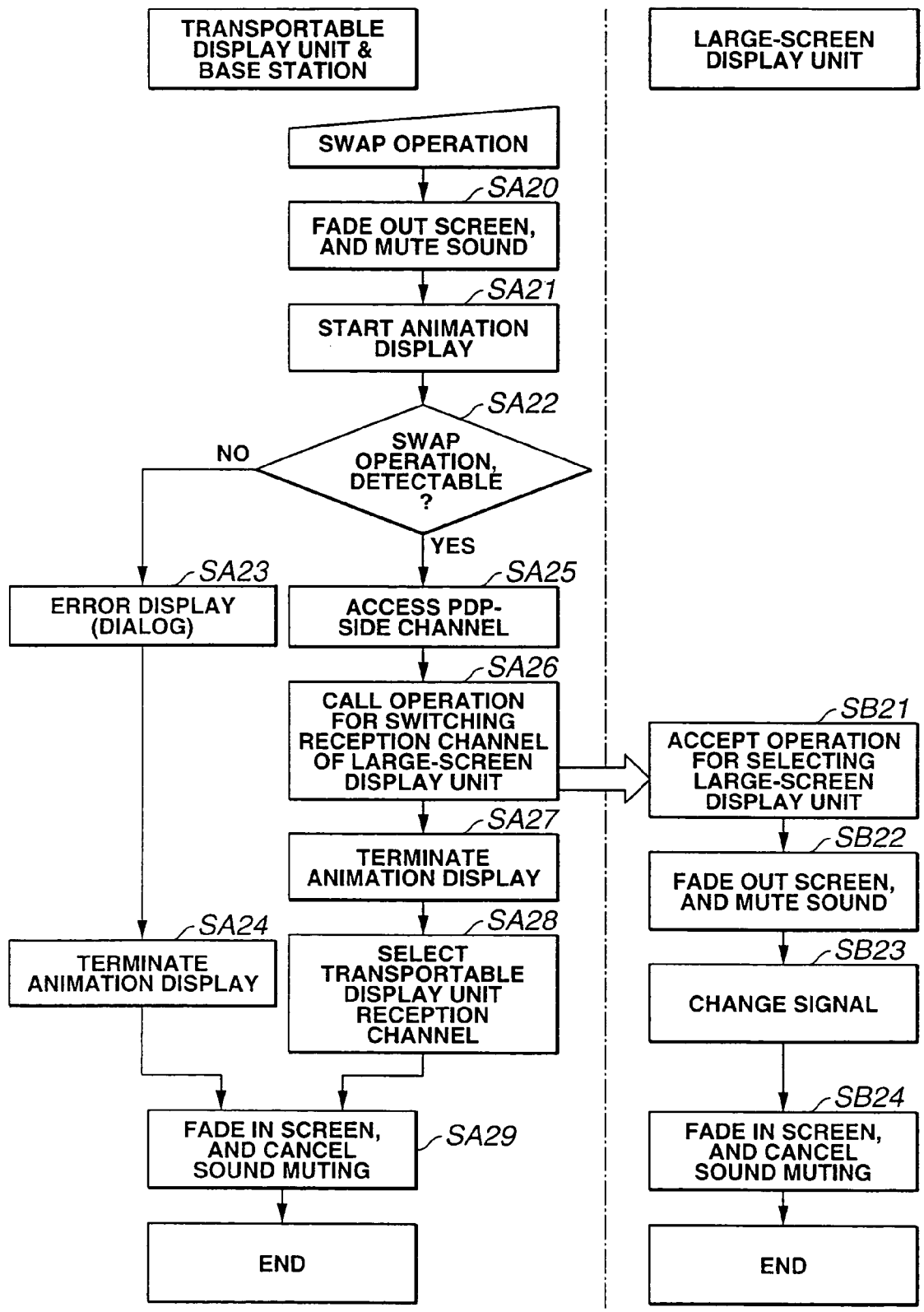
FIG. 10 shows a flow of operations made in controlling the video display system in FIG. 1 by swap-based input of a command.

Further, upon reception of a swap command, the controller 230 of the base station 200 will make a parallel swap-control of both the transportable and large-screen display units 100 and 300 as shown in the flow diagram in FIG. 10.

More specifically, for control of a swap operation, the screen is faded out and the sound is muted at the transportable display unit 100 (in step SA20), an animation display control is started (in step SA21) and it is judged whether the swap operation is possible (in step SA22). In case the result of the judgment is negative (NO), namely, if the swap operation is impossible because the transportable display unit 100 is out of a radio communication range or the transportable display unit 100 is locked against operation at the base station 200, the controller 230 of the latter will make a malfunction indication (in step SA23), terminate the animation display control (in step SA24), fade in the screen and cancel the sound muting (in step SA29), and then exit the swap-operation control.

Also, in case the result of the judgment in step SA22 is affirmative (YES), namely, if the swap operation is possible, the controller 230 will catch the reception channel of the large-screen display unit 300 from the transportable display unit 100 (in step SA25), call, from the transportable display unit 100, an operation for switching the reception channel of the large-screen display unit 300 to that of the transportable display unit 100 (in step SA26), terminate the animation display control (in step SA27), execute the operation for switching the reception channel of the transportable display unit 100 to that of the large-screen display unit 300, having been caught in step SA25 (in step SA28), fade in the screen and cancel the sound muting (in step SA29), and then exit the swap-operation control.

Upon reception of the call for the operation for switching the reception channel (in step SB21), the large-screen display unit 300 will fade in the screen and control the sound muting (in step SB22), execute the signal switching operation such as scan rate change (in step SB23), fade in the screen and cancel the sound muting (in step SB24), and then exit the swap-operation control.

Figure 11A:
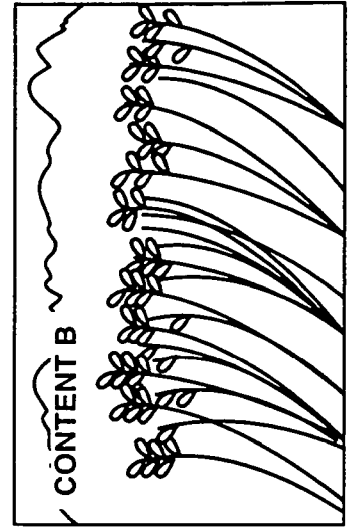
FIG. 11 shows changes of a display by the swap-based command input.
Figure 11A:
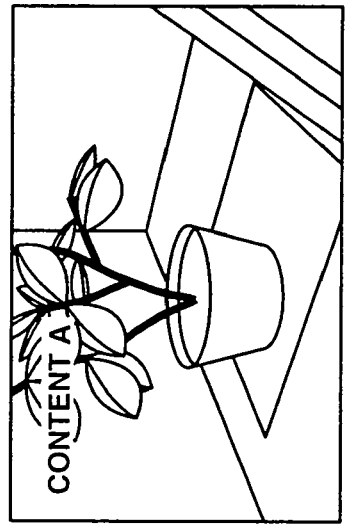
Figure 11B:
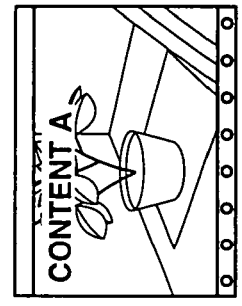
Figure 11B:
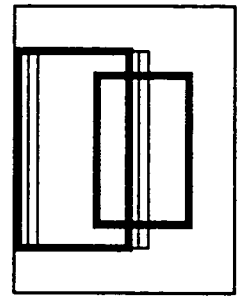
Figure 11B:
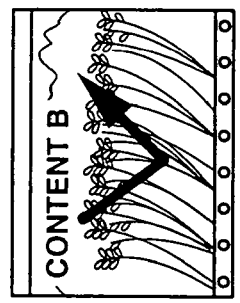

With the above swap-operation control, the display at the large-screen display unit 300 is changed to a display at the transportable display unit 100 as shown in FIG. 11A, and the display at the transportable display unit 100 is changed to a display at the large-screen display unit 300 via an animation display as shown in FIG. 11B.

In the aforementioned embodiment, the first tuner 202A of the base station 200 controls a screen swap operation to make swapping between the transportable display unit 100 and large-screen display unit 300 for display of a TV broadcast program selected by the second tuner 202B. Namely, the control of the throw-operation, catch-operation and swap-operation has been described in the foregoing. In the video display system 1, it is also possible to make swapping between the transportable display unit 100 and large-screen display unit 300 similarly by operating the selector 206 for display of a satellite broadcast program provided as a satellite broadcast signal selected by STB or a movie reproduced by a VTR or DVD drive, if any connected as an external input device to the base station 200.

Also in the video display system 1, the OSD processor 105 displays a control panel as shown in FIG. 5 for the transportable display unit 100 on the display screen of the LCD 107 on which the touch panel 121 is provided, and the controller 130 of the transportable display unit 100 accepts a user's operation of a throw button TB, catch button CB or swap button SB on the control panel to generate a throw command, catch command or swap command. Thus, a throw, catch or swap operation can be controlled correspondingly to the button operation, not to any gesture input.

Also in the video display system 1, a lock switch provided at the key-input unit 239 of the base station 200 can be used not to accept any throw-, catch- or swap-operation control based on the gesture input or button operation.

Note here that although the aforementioned video display system 1 according to the embodiment of the present invention includes the transportable display unit 100, base station 200 and large-screen display unit 300 and is designed to display a video signal supplied from the base station 200 at the transportable display unit 100 and large-screen display unit 300, the base station 200 may supply a video signal by radio or cable transmission to a plurality of transportable display units 100 as well as to a plurality of large-screen display units 300.

In the video display system 1 including at least the two display units 100 and 300 and the base station 200 which supplies a video signal to the two display units 100 and 300, the controller 130 of the transportable display unit 100 generates an operation instruction for selection of an image for display, corresponding to the direction of a user's touch on the display screen surface, on the basis of a detection output of screen-touch location from the screen-touch positioning means (touch panel 121 and coordinate detector 122) provided on the display screen of the image display (LCD 107) of the transportable display unit 100 which displays an image corresponding to the video signal supplied from the base station 200 and that detects the location of the touch on the display screen surface the user touches with the finger or the like, and sends the operation instruction from the two-way communication means (transmission processor 112) to the base station 200, and the controller 230 of the base station 200 controls at least the two tuners 202A and 202B, provided at the base station 200 and each capable of selecting a reception channel independently of each other in response to the to-be-displayed image selecting operation instruction, to select a channel. Thus, for supply of a video signal from the base station to a plurality of display units, the user can transfer a video signal between the base station and plurality of display units by stroking the display screen with the finger, and intuitively make an operation selection quite different from that by a button on the conventional remote controller.

In the aforementioned video display system 1 according to the present invention, the touched positioning means includes the touch panel 121 and the coordinate detector 122 that recognizes the location of a touch on the surface of the touch panel 121 as a coordinate position. In response to a gesture input made by stroking, with the finger, the surface of the touch panel 121, the controller 130 of the transportable display unit 100 extracts samples at every fixed times or distances from a detection output from the coordinate detector 122, judges, based on an aspect ratio of the stroke, in which direction the stroking has been made, horizontal or vertical, and generate generates a screen select instruction corresponding to a direction in which the user has stroked the display screen surface with the finger.

Also, in the aforementioned video display system 1 according to the present invention, the operation instruction generating means, that is, the controller 130 of the transportable display unit 100, generates a screen select instruction corresponding to the direction of a user's finger stroke taken as a valid one when the stroking is larger in length than specified and shorter in duration than specified, for example.

In the transportable display unit 100, the operation instruction generating means (controller 130) can control the channel selecting operation of the two tuners 202A and 202B each of which supplies a video signal from the base station 200 to the display units 100 and 300 by generating an operation instruction resulted from assignment of a channel select command to an input made by a horizontal finger stroke on the surface of the display screen, and sending it from the transportable display unit 100 to the base station 200 via the two-way communication means (transmission processor 112).

Also, in the transportable display unit 100, the controller 130 can make a channel selection control to set the reception channel of the tuner 202A that supplies a video signal from the base station 200 to the display unit 100 to that of the tuner 202B that supplies a video signal from the base station 200 to the other display unit 300 by generating an operation instruction resulted from assignment of a screen change command (throw command) to a vertical finger stroke on the display screen surface on the basis of a detection output of screen-touch location from the screen-touch positioning means (touch panel 121 and coordinate detector 122), and sending it from the display unit 100 to the base station 200 via the two-way communication means (transmission processor 112).

Also, in the transportable display unit 100, the controller 130 can make a channel selection control to set the reception channel of the tuner 202B that supplies a video signal from the base station 200 to the display unit 300 to that of the tuner 202A that supplies a video signal from the base station 200 to the other display unit 100 by generating an operation instruction resulted from assignment of a screen change command (catch command) to a vertical finger stroke on the display screen surface on the basis of a detection output of screen-touch location from the touch positioning means (touch panel 121 and coordinate detector 122), and sending it from the display unit 100 to the base station 200 via the two-way communication means (transmission processor 112).

Also, in the transportable display unit 100, the controller 130 can make a channel selection control to swap the reception channel of the tuner 202A that supplies a video signal from the base station 200 to the display unit 100 with that of the tuner 202B that supplies a video signal from the base station 200 to the other display unit 300 by generating an operation instruction resulted from assignment of a screen change command (swap command) to a vertical finger stroke on the display screen surface on the basis of a detection output of screen-touch location from the screen-touch positioning means (touch panel 121 and coordinate detector 122), and sending it from the display unit 100 to the base station 200 via the two-way communication means.

Also in the transportable display unit 100, when the user strokes the display screen surface with the finger upward, downward or downward and upward, for example, the controller 130 generates an operation instruction formed with one of first to third screen select commands (throw, catch and swap) assigned to the finger stroke correspondingly to the direction of as user's finger stroke. With an operation instruction formed with the first screen select command (throw) assigned to the finger stroke, a channel selection is made to set the reception channel of the tuner 202A that supplies a video signal from the base station 200 to the display unit 100 to that of the tuner 202B that supplies a video signal from the base station 200 to the other display unit 300. With an operation instruction formed with the second screen select command (catch) assigned to the finger stroke, a channel selection is made to set the reception channel of the tuner 202B that supplies a video signal from the base station 200 to the other display unit 300 to that of the tuner 202A that supplies a video signal from the base channel 200 to the display unit 100. With an operation instruction formed with the third screen select command (swap) assigned to the finger stroke, a channel selection is made to swap the reception channel of the tuner 202A that supplies a video signal from the base station 200 to the display unit 100 with that of the tuner 202B that supplies a video signal from the base station 200 to the other display unit 300.

Further in the video display system 1 according to the present invention, the transportable display unit 100 can display an animation indicating that a display screen has been selected by swapping corresponding to a screen select command.

Further in the video display system 1 according to the present invention, upon reception of a call for a reception channel selection based on the screen select command, the other display unit 300 can fade out the screen and control the sound muting, select a signal, and fade in the screen and cancel the sound muting.

Also, in the video display system 1 including at least the two display units 100 and 300 and the base station 200 which supplies to the two display units 100 and 300, the controller 130 of the transportable display unit 100 generates an operation instruction for selection of an image for display, which corresponds to a direction in which the user has stroked the display screen surface, on the basis of a detection output of screen-touch location from the screen-touch positioning means (touch panel 121 and coordinate detector 122) provided on the display screen of the image display (LCD 107) of the transportable display unit 100 which displays an image corresponding to the video signal supplied from the base station 200 and that detects the location of the touch on the display screen surface the user touches with the finger or the like, and sends the operation instruction from the two-way communication means (transmission processor 112) to the base station 200, and the controller 230 of the base station 200 controls the selector 206 provided at the base station 200 in response to the to-be-displayed image selecting operation instruction, thereby permitting to selectively output a signal from the demodulator 203, the external input terminals 204 and 205 or from the controller 230. For supply of a video signal from the base station to a plurality of display units, the user can transfer a video signal between the base station and plurality of display units by stroking a display screen with the finger, and intuitively make an operation selection quite different from that by a button on the conventional remote controller. Also in this case, when the user strokes the display screen surface with the finger upward, downward or downward and upward, the transportable display unit 100 can generate, by the controller 130, an operation instruction formed with one of first to third screen select commands (throw, catch and swap) assigned to the finger stroke correspondingly to the direction of a user's finger stroke to select one of various display screens.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A video display system comprising a minimum of two display units and a base station that supplies a video signal to the display units, in which:

the base station includes:
    a minimum of two tuning means each capable of selecting a reception channel independently of each other;
    a video signal output means for supplying a video signal on the reception channel selected by each of the minimum of two tuning means to the minimum of two display units;
    a two-way communication means for transferring information signals to and from at least one of the minimum of two display units; and
    a control means for controlling the minimum of two tuning means, and
at least one of the minimum of two display units which transfers information signals to and from the base station includes:
    a two-way communication means for transferring the information signals to and from the base station;
    a video display for displaying an image corresponding to the video signal supplied from the base station;
    a screen-touch positioning means provided on a display screen of the video display for recognition of the location of a touch the user gives with the finger on the surface of the display screen; and
    an operation instruction generating means for generating a display-image select instruction corresponding to the direction of a user's touch by identifying the direction of the user's touch on the display screen solely on the basis of a detection output of screen-touch location from the screen-touch positioning means,
receiving the display-image select instruction generated by the operation instruction generating means via the two-way communication means, the controlling means in the base station controlling the channel selecting operation of the minimum of two tuning means according to the display-image select instruction.

2. The video display system according claim 1, wherein the screen-touch positioning means includes a touch panel and a coordinate detector that recognizes the location of the user's touch on the display screen as a coordinate position, extracts sample points at every fixed times or distances from a detection output given by the coordinate detector correspondingly to a user's stroking of the touch panel, judges, based on an aspect ratio of the user's stroking, in which direction the stroking has been made, horizontal or vertical, and has the operation instruction generating means generate a display-image select instruction corresponding to the result of the judgment.

3. The video display system according to claim 2, wherein the operation instruction generating means generates a display-image select instruction corresponding to the direction of a user's stroking taken as a valid one when the stroke is larger in length than specified and shorter in duration than specified.

4. The video display system according to claim 2, wherein the display unit including the two-way communication means that transfers information signals to and from the base station has the operation instruction generating means generate an operation instruction formed with a channel select command assigned to a horizontal stroke, to thereby control the channel selecting operation of the tuning means that supplies a video signal from the base station to the display unit.

5. The video display system according to claim 2, wherein the display unit including the two-way communication means that transfers information signals to and from the base station has the operation instruction generating means generate, in case the user strokes the display screen with the finger upward, downward or downward and upward, an operation instruction formed with any of first to third screen swap commands assigned to the finger stroke, as a display-image select instruction corresponding to the stroking direction, to thereby control the channel selection for setting, according to the operation instruction formed with the first screen swap command assigned to the finger stroke, the reception channel of the tuning means that supplies a video signal from the base station to the display unit to that of the tuning means that supplies from the base station to the other display unit; control the channel selection for setting, according to the operation instruction formed with the second screen swap command assigned to the finger stroke, the reception channel of the tuning means that supplies a video signal from the base station to the other display unit to that of the tuning means that supplies from the base station to the display unit; and control the channel selection for swapping, according to the operation instruction formed with the third screen swap command assigned to the finger stroke, the reception channel of the tuning means that supplies a video signal from the base station to the display unit with that of the tuning means that supplies from the base station to the other display unit.

6. The video display system according to claim 5, wherein the display unit including the two-way communication means that transfers information signals to and from the base station provides an animation display indicating that a screen swapping has been made correspondingly to the first to third screen swap commands.

7. The video display system according to claim 1, wherein the display unit including the two-way communication means that transfers information signals to and from the base station has the operation instruction generating means generate an operation instruction formed with a channel select command assigned to a horizontal stroke on the basis of a detection output of screen-touch location from the screen-touch positioning means, and transmits the operation instruction to the base station via the two-way communication means, to thereby control the channel selecting operation of the tuning means that supplies a video signal from the base station to the display unit.

8. The video display system according to claim 1, wherein the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, and transmits the operation instruction to the base station via the two-way communication means, to thereby control the channel selection for setting the reception channel of the tuning means that supplies a video signal from the base station to the display unit to that of the tuning means that supplies a video signal from the base station to the other display unit.

9. The video display system according to claim 8, wherein the display unit including the two-way communication means that transfers information signals to and from the base station judges whether a screen swapping corresponding to the vertical stroke is possible and generates an operation instruction formed with the screen swap command assigned to the finger stroke when the screen swap operation is possible, to thereby call an operation for selection of the reception channel of the other display unit and provide an animation display indicating that a screen swapping corresponding to the vertical stroke has been made.

10. The video display system according to claim 9, wherein receiving a call for an operation for selection of a reception channel selection under the screen swap command, the other display unit controls screen fade-out and sound muting and makes a signal selection to fade in the screen and cancel the sound muting.

11. The video display system according to claim 1, wherein the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, and transmits the operation instruction to the base station via the two-way communication means, to thereby control the channel selection for setting the reception channel of the tuning means that supplies the video signal from the base station to the other display unit to that of the tuning means that supplies the video signal from the base station to the display unit.

12. The video display system according to claim 11, wherein the display unit including the two-way communication means that transfers information signals to and from the base station judges whether the screen swapping corresponding to the vertical stroke is possible, catches the reception channel of the other display unit when the screen swapping is determined to be possible, generates an operation instruction formed with the screen swap command assigned to the finger stroke, calls an operation for selection of the reception channel of the other display unit, and provides an animation display indicating that a screen swapping corresponding to the vertical stroke has been done, to thereby make a channel selection for switching the reception channel of the display unit to the caught reception channel of the other display unit.

13. The video display system according to claim 12, wherein receiving a call for an operation for selection of a reception channel under the screen swap command, the other display unit makes a catch indication to inform that its reception channel has been caught by the display unit with no channel selection.

14. The video display system according to claim 1, wherein the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, and transmits the operation instruction to the base station via the two-way communication means, to thereby control the channel selection for swapping the reception channel of the tuning means that supplies a video signal from the base station to the display unit with that of the tuning means that supplies a video signal from the base station to the other display unit.

15. The video display system according to claim 14, wherein the display unit including the two-way communication means that transfers information signals to and from the base station judges whether a screen swapping corresponding to the vertical stroke is possible, catches the reception channel of the other display unit when the screen swapping is determined to be possible, generates an operation instruction formed with a screen swap command assigned to the finger stroke, calls an operation for switching the reception channel of the other display unit to that of the display unit, and provides an animation display indicating that the screen swapping corresponding to the vertical stroke has been done, to thereby make a channel selection for switching the reception channel of the display unit to the caught reception channel of the other display unit.

16. The video display system according to claim 15, wherein receiving a call for an operation for selection of a reception channel under the screen swap command, the other display unit controls screen fade-out and sound muting and makes a signal selection to fade in the screen and cancel the sound muting.

17. A video display system comprising a minimum of two display units and a base station that supplies a video signal to the display units, in which:
the base station includes:
a signal selecting means for selecting one of a plurality of input video signals for supply to the minimum of two display units;
a video signal output means for supplying the video signal selected by the signal selecting means to the minimum of two display units;
a two-way communication means for transferring information signals to and from at least one of the minimum of two display units; and
a control means for controlling the signal selecting means, and
at least one of the minimum of two display units which transfers information signals to and from the base station includes:
a two-way communication means for transferring the information signals to and from the base station;
a video display for displaying an image corresponding to the video signal supplied from the base station;
a screen-touch positioning means provided on a display screen of the video display to recognize the location of a touch the user gives with the finger on the surface of the display screen; and
an operation instruction generating means for generating a display-image select instruction corresponding to the direction of a user's touch by identifying the direction of the user's touch on the display screen solely on the basis of a detection output of screen-touch location from the screen-touch positioning means,
the controlling means in the base station receiving the display-image select instruction generated by the operation instruction generating means via the two-way communication means, and controlling the signal selecting operation of the signal selecting means according to the display-image select instruction.

18. The video display system according to claim 17, wherein the screen-touch positioning means includes a touch panel and a coordinate detector that recognizes the location of the user's touch on the display screen as a coordinate position, extracts sample points at every fixed times or distances from a detection output given by the coordinate detector correspondingly to a user's stroking of the touch panel, judges, based on an aspect ratio of the stroke, in which direction the stroke has been made, horizontal or vertical, and has the operation instruction generating means generate a display-image select instruction corresponding to the result of the judgment.

19. The video display system according to claim 18, wherein the operation instruction generating means generates a display-image select instruction corresponding to the direction of a user's finger stroke taken as a valid one when the stroke is larger in length than specified and shorter in duration than specified.

20. The video display system according to claim 18, wherein the display unit including the two-way communication means that transfers information signals to and from the base station has the operation instruction generating means generate an operation instruction formed with a display-image select command assigned to a horizontal stroke, to thereby control the signal selecting operation of the signal selecting means that supplies a video signal from the base station to the display unit.

21. The video display system according to claim 18, wherein the display unit including the two-way communication means that transfers information signals to and from the base station has the operation instruction generating means generate, in case the user strokes the display screen with the finger upward, downward or downward and upward, an operation instruction formed with any of first to third screen swap commands assigned to the finger stroke, as a display-image select instruction corresponding to the stroking direction, to thereby control the signal selecting means to supply the video signal supplied from the base station to the display unit to the other display unit as well according to the operation instruction formed with the first screen swap command assigned to the finger stroke; control the signal selecting means to supply the video signal supplied from the base station to the other display unit to the display unit as well according to the operation instruction formed with the second screen swap command assigned to the finger stroke; and control the signal selecting means to supply the other display unit with the video signal supplied from the base station to the display unit while supplying the display unit with the video signal supplied from the base station to the other display unit, according to the operation instruction formed with the third screen swap command assigned to the finger stroke.

22. The video display system according to claim 21, wherein the display unit including the two-way communication means that transfers information signals to and from the base station provides an animation display indicating that a screen swapping corresponding to the first to third screen swap commands has been made.

23. The video display system according to claim 17, wherein the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, and transmits the operation instruction to the base station via the two-way communication means, to thereby control the signal selecting means to supply the video signal supplied from the base station to the display unit to the other display unit as well.

24. The video display system according to claim 23, wherein the display unit including the two-way communication means that transfers information signals to and from the base station judges whether a screen swapping corresponding to the vertical stroke is possible and generates an operation instruction formed with the screen swap command assigned to the finger stroke when the screen swap operation is possible, to thereby call an operation for selecting a video signal at the other display unit and provide an animation display indicating that a screen swapping corresponding to the vertical stroke has been made.

25. The video display system according to claim 24, wherein receiving a call for an operation for selection of a video signal under the screen swap command, the other display unit controls screen fade-out and sound muting and makes a signal selection to fade in the screen and cancel the sound muting.

26. The video display system according to claim 17, wherein the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, and transmits the operation instruction to the base station via the two-way communication means, to thereby control the signal selecting means to supply the video signal supplied from the base station to the other display unit to the display unit as well.

27. The video display system according to claim 26, wherein the display unit including the two-way communication means that transfers information signals to and from the base station judges whether the screen swapping corresponding to the vertical stroke is possible, catches input information to the other display unit when the screen swapping is determined to be possible, generates an operation instruction formed with the screen swap command assigned to the finger stroke, calls an operation for selection of the video signal at the other display unit, and provides an animation display indicating that a screen swapping corresponding to the vertical stroke has been done, to thereby make a signal selection for switching the video signal at the display unit to that formed from the caught input information to the other display unit.

28. The video display system according to claim 27, wherein receiving a call for an operation for selection of a video signal under the screen swap command, the other display unit makes a catch indication to inform that the input information has been caught by the display unit with no video signal selection.

29. The video display system according to claim 17, wherein the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, and transmits the operation instruction to the base station via the two-way communication means, to thereby control the signal selecting means to supply the video signal supplied from the base station to the display unit to the other display unit and the video signal supplied from the based station to the other display unit to the display unit.

30. The video display system according to claim 29, wherein the display unit including the two-way communication means that transfers information signals to and from the base station judges whether the screen swapping corresponding to the vertical stroke is possible, catches input information to the other display unit when the screen swapping is determined to be possible, generates an operation instruction formed with the screen swap command assigned to the vertical stroke, calls an operation for switching the video signal at the other display unit to that at the display unit, and provides an animation display indicating that a screen swapping corresponding to the vertical stroke has been done, to thereby make a signal selection for switching the video signal at the display unit to that formed from the caught input information to the other display unit.

31. The video display system according to claim 30, wherein receiving a call for an operation for selection of a video signal under the screen swap command, the other display unit controls screen fade-out and sound muting and makes a signal selection to fade in the screen and cancel the sound muting.

32. A video display controller for use in a video display system including a minimum of two display units and a base station that supplies a video signal to the display units, in which:
the base station includes:
a minimum of two tuning means each capable of selecting a reception channel independently of each other;
a video signal output means for supplying a video signal on the reception channel selected by each of the minimum of two tuning means to the minimum of two display units;
a two-way communication means for transferring information signals to and from at least one of the minimum of two display units; and
a control means for controlling the minimum of two tuning means, and
at least one of the minimum of two display units which transfers information signals to and from the base station including:
a two-way communication means for transferring the information signals to and from the base station;
a video display for displaying an image corresponding to the video signal supplied from the base station;
a screen-touch positioning means provided on a display screen of the video display to recognize the location of a touch the user gives with the finger on the surface of the display screen; and
an operation instruction generating means for generating a display-image select instruction corresponding to the direction of a user's touch by identifying the direction of the user's touch on the display screen solely on the basis of a detection output of screen-touch location from the screen-touch positioning means,
receiving the display-image select instruction generated by the operation instruction generating means in the display unit via the two-way communication means, the controlling means in the base station controlling the channel selecting operation of the minimum of two tuning means according to the display-image select instruction.

33. The video display controller according to claim 32, wherein the screen-touch positioning means includes a touch panel and a coordinate detector that recognizes the location of the user's touch on the display screen as a coordinate position, extracts sample points at every fixed times or distances from a detection output given by the coordinate detector correspondingly to a user's stroking of the touch panel, judges, based on an aspect ratio of the stroke, in which direction the stroke has been made, horizontal or vertical, and has the operation instruction generating means generate a display-image select instruction corresponding to the result of the judgment.

34. The video display controller according to claim 33, wherein the operation instruction generating means generates a display-image select instruction corresponding to the direction of a user's finger stroke taken as a valid one when the stroke is larger in length than specified and shorter in duration than specified.

35. The video display controller according to claim 33, wherein the display unit including the two-way communication means that transfers information signals to and from the base station has the operation instruction generating means generate an operation instruction formed with a channel select command assigned to a horizontal stroke, to thereby control the channel selecting operation of the tuning means that supplies a video signal from the base station to the display unit.

36. The video display controller according to claim 33, wherein the display unit including the two-way communication means that transfers information signals to and from the base station has the operation instruction generating means generate, in case the user strokes the display screen with the finger upward, downward or downward and upward, an operation instruction formed with any of first to third screen swap commands assigned to the finger stroke, as a display-image select instruction corresponding to the stroking direction, to thereby control the channel selection for setting, according to the operation instruction formed with the first screen swap command assigned to the finger stroke, the reception channel of the tuning means that supplies a video signal from the base station to the display unit to that of the tuning means that supplies from the base station to the other display unit; control the channel selection for setting, according to the operation instruction formed with the second screen swap command assigned to the finger stroke, the reception channel of the tuning means that supplies a video signal from the base station to the display unit to that of the tuning means that supplies from the base station to the other display unit; and control the channel selection for swapping, according to the operation instruction formed with the third screen swap command assigned to the finger stroke, the reception channel of the tuning means that supplies a video signal from the base station to the display unit with that of the tuning means that supplies from the base station to the other display unit.

37. The video display controller according to claim 36, wherein the display unit including the two-way communication means that transfers information signals to and from the base station provides an animation display indicating that a screen swapping corresponding to the first to third screen swap commands has been made.

38. The video display controller according to claim 32, wherein the display unit including the two-way communication means that transfers information signals to and from the base station has the operation instruction generating means generate an operation instruction formed with a channel select command assigned to a horizontal stroke on the basis of a detection output of screen-touch location from the screen-touch positioning means, and transmits the operation instruction to the base station via the two-way communication means, to thereby control the channel selecting operation of the tuning means that supplies a video signal from the base station to the display unit.

39. The video display controller according to claim 32, wherein the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, and transmits the operation instruction to the base station via the two-way communication means, to thereby control the channel selection for setting the reception channel of the tuning means that supplies a video signal from the base station to the display unit to that of the tuning means that supplies the video signal from the base station to the other display unit.

40. The video display controller according to claim 39, wherein the display unit including the two-way communication means that transfers information signals to and from the base station judges whether a screen swapping corresponding to the vertical stroke is possible and generates an operation instruction formed with the screen swap command assigned to the finger stroke when the screen swap operation is possible, to thereby call an operation for selection of the reception channel of the other display unit and provide an animation display indicating that a screen swapping corresponding to the vertical stroke has been made.

41. The video display controller according to claim 40, wherein receiving a call for an operation for selection of a reception channel selection under the screen swap command, the other display unit controls screen fade-out and sound muting and makes a signal selection to fade in the screen and cancel the sound muting.

42. The video display controller according to claim 32, wherein the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, and transmits the operation instruction to the base station via the two-way communication means, to thereby control the channel selection for setting the reception channel of the tuning means that supplies the video signal from the base station to the other display unit to that of the tuning means that supplies the video signal from the base station to the display unit.

43. The video display controller according to claim 42, wherein the display unit including the two-way communication means that transfers information signals to and from the base station judges whether the screen swapping corresponding to the vertical stroke is possible, catches the reception channel of the other display unit when the screen swapping is determined to be possible, generates an operation instruction formed with the screen swap command assigned to the finger stroke, calls an operation for selection of the reception channel of the other display unit, and provides an animation display indicating that a screen swapping corresponding to the vertical stroke has been done, to thereby make a channel selection for switching the reception channel of the display unit to the caught reception channel of the other display unit.

44. The video display controller according to claim 43, wherein receiving a call for an operation for selection of a reception channel under the screen swap command, the other display unit makes a catch indication to inform that its reception channel has been caught by the display unit with no channel selection.

45. The video display controller according to claim 32, wherein the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, and transmits the operation instruction to the base station via the two-way communication means, to thereby control the channel selection for swapping the reception channel of the tuning means that supplies a video signal from the base station to the display unit with that of the tuning means that supplies a video signal from the base station to the other display unit.

46. The video display controller according to claim 45, wherein the display unit including the two-way communication means that transfers information signals to and from the base station judges whether a screen swapping corresponding to the vertical stroke is possible, catches the reception channel of the other display unit when the screen swapping is determined to be possible, generate an operation instruction formed with a screen swap command assigned to the finger stroke, calls an operation for switching the reception channel of the other display unit to that of the display unit, and provides an animation display indicating that the screen swapping corresponding to the vertical stroke has been done, to thereby make a channel selection for switching the reception channel of the display unit to the caught reception channel of the other display unit.

47. The video display controller according to claim 46, wherein receiving a call for an operation for selection of a reception channel under the screen swap command, the other display unit controls screen fade-out and sound muting and makes a signal selection to fade in the screen and cancel the sound muting.

48. A video display controller for use in a video display system including a minimum of two display units and a base station that supplies a video signal to the display units, in which:
  the base station includes:
    a signal selecting means for selecting one of a plurality of input video signals for supply to the minimum of two display units;
    a video signal output means for supplying the video signal selected by the signal selecting means to the minimum of two display units;
    a two-way communication means for transferring information signals to and from at least one of the minimum of two display units; and
    a control means for controlling the signal selecting means, and
  at least one of the minimum of two display units which transfers information signals to and from the base station includes:
    a two-way communication means for transferring the information signals to and from the base station;
    a video display for displaying an image corresponding to the video signal supplied from the base station;
    a screen-touch positioning means provided on a display screen of the video display to recognize the location of a touch the user gives with the finger on the surface of the display screen; and
    an operation instruction generating means for generating a display-image select instruction corresponding to the direction of a user's touch by identifying the direction of the user's touch on the display screen solely on the basis of a detection output of screen-touch location from the screen-touch positioning means,
  receiving the display-image select instruction generated by the operation instruction generating means via the two-way communication means, the controlling means in the base station controlling the signal selecting operation of the signal selecting means according to the display-image select instruction.

49. The video display controller according to claim 48, wherein the screen-touch positioning means includes a touch panel and a coordinate detector that recognizes the location of the user's touch on the display screen as a coordinate position, extracts sample points at every fixed times or distances from a detection output given by the coordinate detector correspondingly to a user's stroking of the touch panel, judges, based on an aspect ratio of the stroke, in which direction the stroke has been made, horizontal or vertical, and has the operation instruction generating means generate a display-image select instruction corresponding to the result of the judgment.

50. The video display controller according to claim 49, wherein the operation instruction generating means generates a display-image select instruction corresponding to the direction of a user's finger stroke taken as a valid one when the stroke is larger in length than specified and shorter in duration than specified.

51. The video display controller according to claim 49, wherein the display unit including the two-way communication means that transfers information signals to and from the base station has the operation instruction generating means generate an operation instruction formed with a display-image select command assigned to a horizontal stroke, to thereby control the signal selecting operation of the signal selecting means that supplies a video signal from the base station to the display unit.

52. The video display controller according to claim 49, wherein the display unit including the two-way communication means that transfers information signals to and from the base station has the operation instruction generating means generate, in case the user strokes the display screen with the finger upward, downward or downward and upward, an operation instruction formed with any of first to third screen swap commands assigned to the finger stroke, as a display-image select instruction corresponding to the stroking direction, to thereby control the signal selecting means to supply the video signal supplied from the base station to the display unit to the other display unit as well according to the operation instruction formed with the first screen swap command assigned to the finger stroke; control the signal selecting means to supply the video signal supplied from the base station to the other display unit to the display unit as well according to the operation instruction formed with the second screen swap command assigned to the finger stroke; and control the signal selecting means to supply the other display unit with the video signal supplied from the base station to the display unit while supplying the display unit with the video signal supplied from the base station to the other display unit, according to the operation instruction formed with the third screen swap command assigned to the finger stroke.

53. The video display controller according to claim 52, wherein the display unit including the two-way communication means that transfers information signals to and from the base station provides an animation display indicating that a screen swapping corresponding to the first to third screen swap commands has been made.

54. The video display controller according to claim 52, wherein the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, and transmits the operation instruction to the base station via the two-way communication means, to thereby control the signal selecting means to supply the video signal supplied from the base station to the display unit to the other display unit as well.

55. The video display controller according to claim 54, wherein the display unit including the two-way communication means that transfers information signals to and from the base station judges whether a screen swapping corresponding to the vertical stroke is possible and generates an operation instruction formed with the screen swap command assigned to the finger stroke on the basis of a detection output of screen-touch location from the screen-touch positioning means when the screen swap operation is possible, and transmits the operation instruction to the base station via the two-way communication means, to thereby call an operation for selecting a video signal at the other display unit and provide an animation display indicating that a screen swapping corresponding to the vertical stroke has been made.

56. The video display controller according to claim 55, wherein receiving a call for an operation for selecting a video signal according to the screen swap command, the other display unit controls screen fade-out and sound muting and makes a signal selection to fade in the screen and cancel the sound muting.

57. The video display controller according to claim 48, wherein the display unit including the two-way communication means that transfers information signals to and from the base station has the operation instruction generating means generate an operation instruction formed assigned to the finger stroke a screen swap command to a vertical stroke on the basis of a detection output of screen-touch location from the screen-touch positioning means, and transmits the operation instruction to the base station via the two-way communication means, to thereby control the signal selecting means to supply the video signal supplied from the base station to the other display unit to the display unit as well.

58. The video display controller according to claim 57, wherein the display unit including the two-way communication means that transfers information signals to and from the base station judges whether the screen swapping corresponding to the vertical stroke is possible, catches input information to the other display unit when the screen swapping is determined to be possible, generates an operation instruction formed with the screen swap command assigned to the finger stroke, calls an operation for selection of the video signal at the other display unit, and provides an animation display indicating that a screen swapping corresponding to the vertical stroke has been done, to thereby make a signal selection for switching the video signal at the display unit to that formed from the caught input information to the other display unit.

59. The video display controller according to claim 58, wherein receiving a call for an operation for selection of a video signal under the screen swap command, the other display unit makes a catch indication to inform that the input information has been caught by the display unit with no video signal selection.

60. The video display controller according to claim 48, wherein the display unit including the two-way communication means that transfers information signals to and from the base station has the operation instruction generating means generate an operation instruction formed with a screen swap command assigned to a vertical stroke on the basis of a detection output of screen-touch location from the screen-touch positioning means, and transmits the operation instruction to the base station via the two-way communication means, to thereby control the signal selecting means to supply the other display unit with the video signal supplied from the base station to the display unit while supplying the display unit with the video signal supplied from the based station to the other display unit.

61. The video display controller according to claim 59, wherein the display unit including the two-way communication means that transfers information signals to and from the base station judges whether the screen swapping corresponding to the vertical stroke is possible, catches input information to the other display unit when the screen swapping is determined to be possible, generates an operation instruction formed with the screen swap command assigned to the vertical stroke, calls an operation for switching the video signal at the other display unit to that at the display unit, and provides an animation display indicating that a screen swapping corresponding to the vertical stroke has been done, to thereby make a signal selection for switching the video signal at the display unit to that formed from the caught input information to the other display unit.

62. The video display controller according to claim 61, wherein receiving a call for an operation for selecting a reception channel according to the screen swap command, the other display unit controls screen fade-out and sound muting and makes a signal selection to fade in the screen and cancel the sound muting.

* * * * *